United States Patent [19]
VanDenberg

[11] Patent Number: 5,538,225
[45] Date of Patent: Jul. 23, 1996

[54] LANDING GEAR FOR SEMITRAILERS

[75] Inventor: Ervin VanDenberg, Massillon, Ohio

[73] Assignee: JOST International of Grand Haven Michigan, Grand Haven, Mich.

[21] Appl. No.: 221,397

[22] Filed: Mar. 31, 1994

[51] Int. Cl.$^6$ ........................................................ B60S 9/02
[52] U.S. Cl. ........................................................ 254/419
[58] Field of Search ................................ 254/419, 424, 254/425, 103; 74/475, 342; 280/766.1, 763.1

[56] References Cited

U.S. PATENT DOCUMENTS

| | | |
|---|---|---|
| 1,686,989 | 10/1928 | Ridley . |
| 2,815,962 | 12/1957 | McKay . |
| 2,885,220 | 5/1959 | Dalton . |
| 2,977,094 | 3/1961 | McKay . |
| 3,010,699 | 11/1961 | McKay . |
| 3,033,522 | 5/1962 | McKay . |
| 3,136,527 | 6/1964 | Griffis ........................ 254/419 |
| 3,201,086 | 8/1965 | Dalton ........................ 254/419 |
| 3,236,501 | 2/1966 | McKay . |
| 3,240,300 | 3/1966 | McKay . |
| 3,259,364 | 7/1966 | Hulverson et al. .......... 254/419 |
| 3,436,987 | 4/1969 | Baxter . |
| 3,518,890 | 7/1970 | Eastman . |
| 3,596,877 | 8/1971 | Eastman . |
| 3,632,086 | 1/1972 | Mai ............................. 254/419 |
| 3,675,497 | 7/1972 | Thomas . |
| 3,861,648 | 1/1975 | Glassmeyer ................ 254/419 |
| 3,892,141 | 7/1975 | Phillips, Jr. et al. . |

(List continued on next page.)

FOREIGN PATENT DOCUMENTS

| | | |
|---|---|---|
| 0006007 | 12/1979 | European Pat. Off. . |
| 0006007A1 | 12/1979 | European Pat. Off. . |
| 0398705 | 11/1990 | European Pat. Off. . |
| 0398705A2 | 11/1990 | European Pat. Off. . |
| 0513973 | 11/1992 | European Pat. Off. . |
| 2251752 | 6/1975 | France . |

OTHER PUBLICATIONS

*Machine Design*, Irving J. Levinson, P. E., Provost, Highland Campus, Oakland Community College, Bloomfield, Michigan, Reston Publishing Co., Inc., Jan. 1978, pp. 389–392.

*Gear Design*, W. A. Tuplin, D. Sc., M. I. Mech. E., The Machinery Publishing Co., Ltd., Jan. 1962, pp. 140–143.

A sales brochure entitled "Contender™", available from Binkley, Transportation Products Division, Warrenton, Missouri 63383.

A sales brochure entitled "Fruehauf Supports" available from Fruehauf Corporation, Detroit, MI.

A sales brochure entitled "Kwik Shift™ Round and Square Leg Trailer Supports," Models CMR and CMS available from Kysor®/ Westran, P.O. Box 921, Byron, IL 61010-0921.

A sales brochure entitled "Mark V Landing Gears and Accessories," available from Holland Hitch Company, Holland, Michigan.

A parts drawing of unknown origin, labelled "Exhibit U", showing a landing gear assembly.

*Primary Examiner*—Robert C. Watson
*Attorney, Agent, or Firm*—Hudak & Shunk Co.

[57] ABSTRACT

A landing gear for semitrailers includes a two-speed single reduction gear assembly having fewer, smaller, and simpler parts, resulting in a compact single reduction gear assembly and cost efficient landing gear unit with a unique clutch-shifting mechanism to provide for shifting from one ratio to another. The single reduction gear assembly is disposed on and about vertically offset input and output shafts further resulting in an easy to crank and shift landing gear unit capable of achieving standard crank handle turn to vertical leg travel distance ratios. The low gear or low speed ratio of the landing gear unit can be varied within a broad range during manufacture, if desired, generally without increasing the overall size or complexity of the two-speed single reduction gear assembly. The landing gear can .further include a universal mounting feature and is durable and simple to use.

30 Claims, 15 Drawing Sheets

U.S. PATENT DOCUMENTS

| | | |
|---|---|---|
| 4,004,830 | 1/1977 | Belke . |
| 4,124,225 | 11/1978 | Lozada et al. . |
| 4,187,333 | 2/1980 | Walther et al. . |
| 4,187,733 | 2/1980 | Walther et al. .......................... 254/419 |
| 4,205,824 | 6/1980 | Mai ........................................ 254/419 |
| 4,482,039 | 11/1984 | Harris . |
| 4,634,144 | 1/1987 | Ringe . |
| 4,824,136 | 4/1989 | Bobby . |
| 4,863,184 | 9/1989 | Mena . |
| 4,871,188 | 10/1989 | Baxter . |
| 4,875,821 | 10/1989 | Oren . |
| 4,889,357 | 12/1989 | Perry . |
| 4,903,977 | 2/1990 | Baxter . |
| 4,905,953 | 3/1990 | Wilson . |
| 4,919,234 | 4/1990 | Pearson et al. . |
| 4,921,269 | 5/1990 | Scully . |
| 4,923,175 | 5/1990 | Bentrup ................................. 254/419 |
| 4,955,450 | 9/1990 | Deinlein-Kalb et al. . |

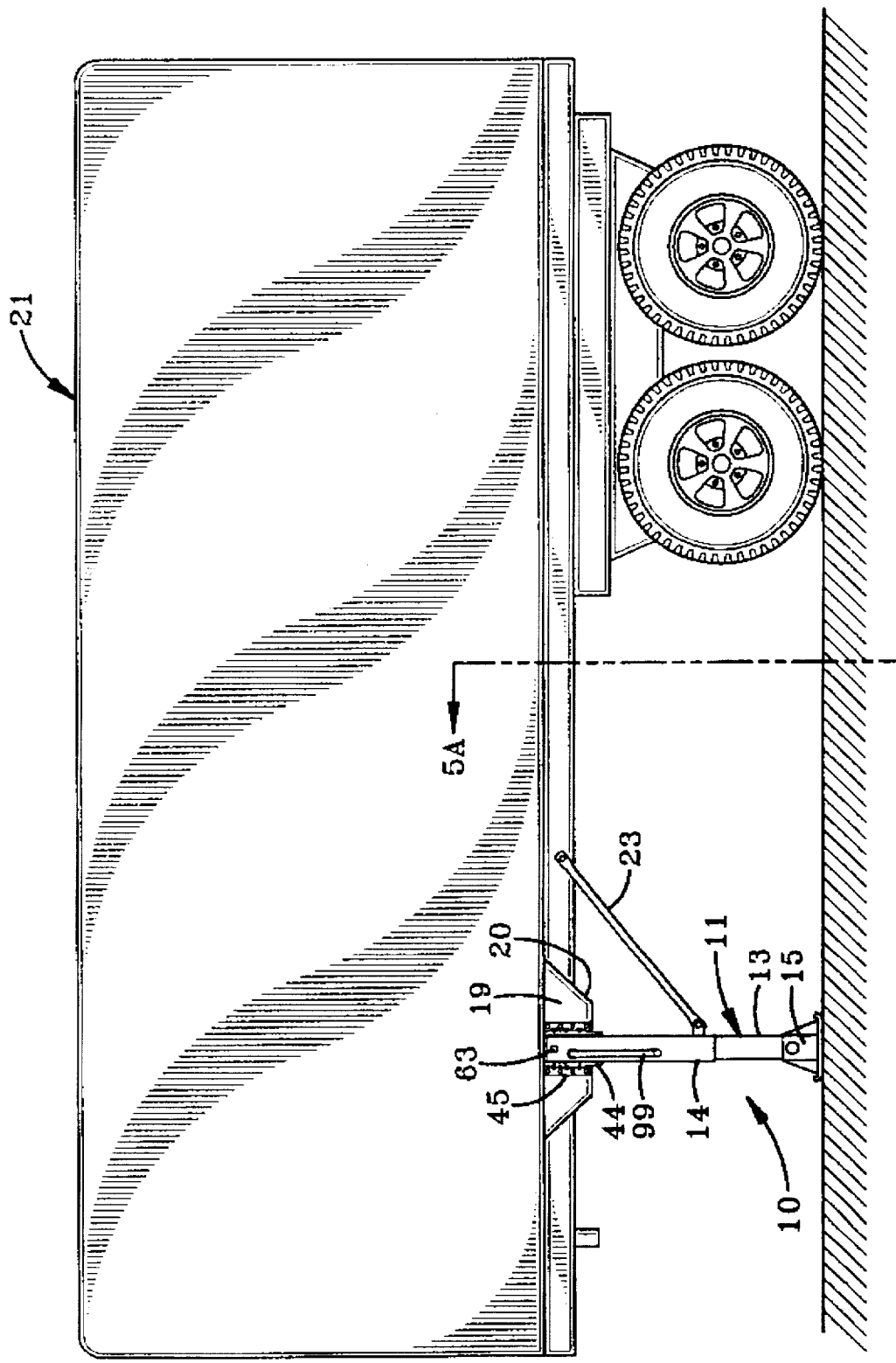

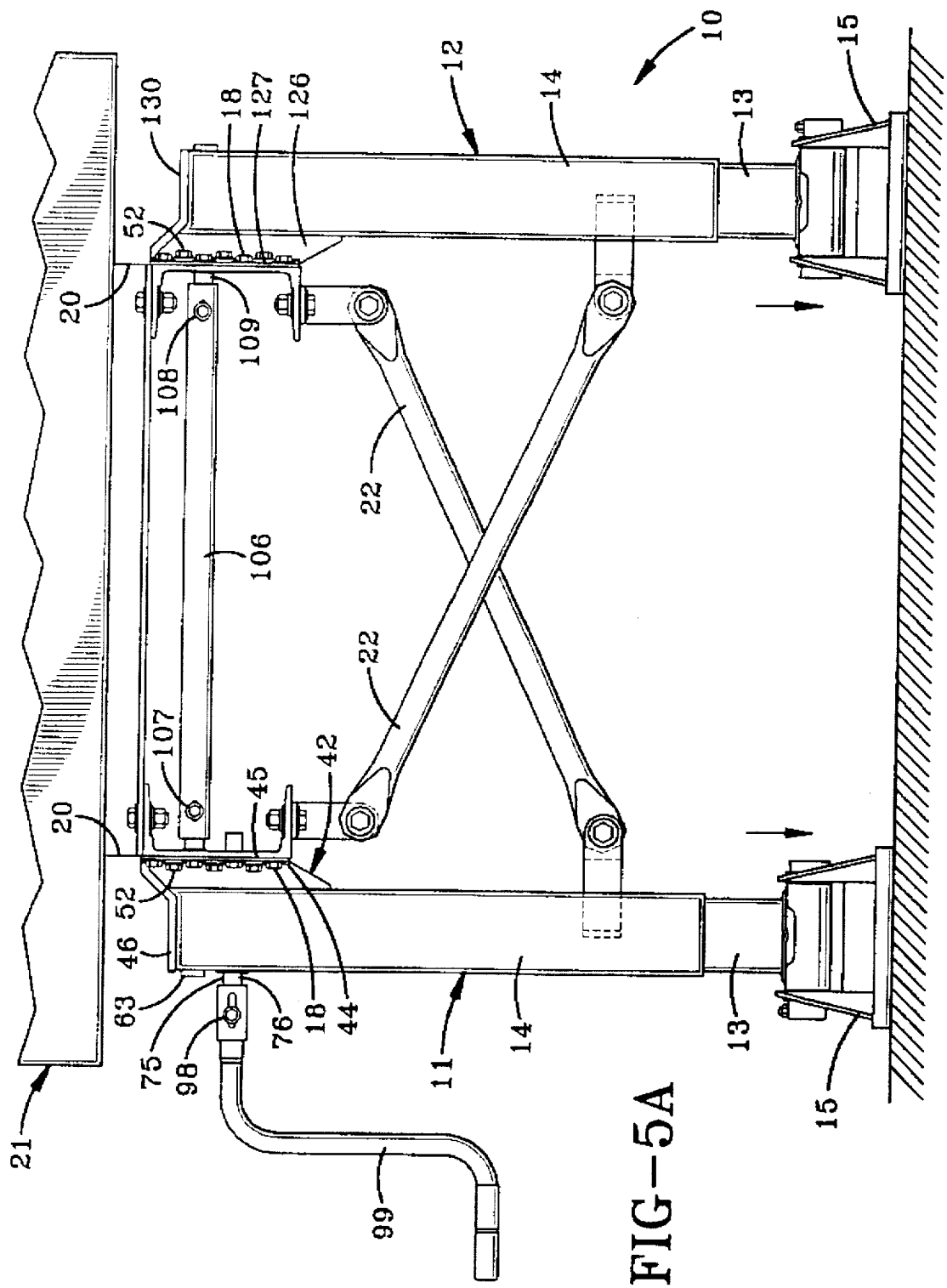

LANDING GEAR FOR SEMITRAILERS

FIELD OF THE INVENTION

The invention relates to landing gear for semitrailers, and in particular to a landing gear having a single reduction gear assembly. More particularly, the invention relates to such a landing gear which achieves standard crank handle turn to vertical travel distance ratios with a two-speed, single-reduction gear assembly, which utilizes fewer, simpler, and smaller parts to achieve such standard ratios resulting in a relatively compact, cost-effective single reduction gear assembly, featuring a unique shift-clutching mechanism which reduces the number of parts and reduces cost while making it easier to shift between high and low speeds.

BACKGROUND

Landing gear for semitrailers have heretofore been and will presumably continue to be a high volume product, with estimated sales in the United States normally exceeding 300,000 sets per year and generating income of more than 50 million dollars. The high demand for landing gear is directly related to the use of semi-trailers pulled by truck tractors as a primary means of shipping goods in the United States.

A conventional two-speed landing gear consists of a pair of gear-driven, laterally spaced, telescopic legs which are mounted on and depend from a front end of the semitrailer which engages the truck tractor.

Landing gear, and particularly two-speed landing gear, are used in association with semitrailers in the following manner. A typical scenario begins with the operator of a truck tractor dropping off the semi-trailer at a location such as a dock for loading or unloading of the semitrailer. This semitrailer is retrieved when loading or unloading is completed, often by another tractor. When disconnecting after positioning the semitrailer in the desired location, the truck operator manually turns a crank handle to extend the legs until the legs engage the ground. The operator typically uses the high gear or high speed of the two-speed gear assembly to quickly extend the landing gear legs from the retracted position to the extended position where the legs contact the ground. It should be noted that when the landing gear assembly is engaged in high gear, quick traversal of a vertical distance can be accomplished due to the low ratio of crank handle turns to inches of vertical leg travel distance afforded by the high gear, which ratio usually is from about 2 to about 5 depending on the unit being utilized. However, the tradeoff for such a low ratio achieved in high gear is a lower mechanical advantage than that which can be achieved in a low gear. In practical terms, this means that the truck operator cannot raise or lower a load in high gear. In low gear the ratio of crank handle turns to distance traveled is higher, usually from about 15 to about 50, but a higher mechanical advantage is enjoyed. This enables the truck operator to raise or lower loads in low gear that could not be moved in high gear, albeit at a slower pace than if such loads could be moved in high gear. In order to pull the truck tractor away from the stationary semitrailer, the operator must disengage the depending kingpin of the semitrailer from the fifth wheel of the truck tractor by disengaging the fifth wheel jaws. Since the tractor is spring-biased in an upward direction, it is desirable to raise the semitrailer to relieve some of the load allowing the tractor to pull away from the semitrailer more easily. Therefore, the operator may shift the gear assembly to low gear in order to further extend the landing gear legs and raise all or part of the load of the semitrailer from the fifth wheel. After releasing the movable jaws of the fifth wheel, the tractor is disengaged from the semitrailer.

When an operator picks up a semitrailer which has been loaded or unloaded, he or she must back the truck tractor fifth wheel under the semitrailer and engage the kingpin. If the semitrailer was resting on a stable surface such as concrete, and a similar tractor is utilized, the necessary clearance to allow coupling most likely still exists between the ground and the kingpin, and the operator merely will back the truck tractor under the semitrailer engaging the kingpin. The operator will shift the landing gear into low gear to lower the load onto the tractor, then shift into high gear and quickly retract the legs to provide clearance for vehicle operation. More particularly, the legs are positioned approximately one foot off of the ground to provide clearance for over-the-road travel. However, if the semitrailer was left on a relatively unstable surface such as soft ground or blacktop, the semitrailer legs sometimes sink into the ground under the load of the trailer between the drop off and pickup times. If this is the case, or if a higher tractor is employed, prior to backing the truck tractor under the semitrailer the operator must further extend the legs to raise the trailer to provide sufficient clearance between the ground and the kingpin. This requires the operator to shift the landing gear into low gear to gain mechanical advantage to raise the trailer. After coupling to the tractor and lowering the trailer load onto the tractor using low gear, the operator then will proceed as described above to retract the legs in high gear to position the legs for over-the-road travel.

As expected, in view of the potential income accruing from possible sales of landing gear units, manufacturers of the landing gear are continually attempting to improve their products to present a more economical landing gear having improved performance features, in order to gain a larger share of the landing gear market.

SUMMARY OF THE INVENTION

Objects of the present invention include providing a landing gear for semitrailers having a two-speed single reduction gear assembly or transmission, in which the gear assembly or transmission is comprised of fewer, smaller and simpler parts thereby making it easier to manufacture and assemble and further resulting in an assembly which is compact and can be contained in a smaller gear box, wherein all of the above factors contribute to a lower overall cost of the landing gear unit.

Another object of the invention is to provide such a landing gear which is easier to crank and shift, and which can be universally mounted.

A further object of the invention is to provide such a landing gear capable of achieving commercially standard crank handle turn to vertical leg travel distance ratios, wherein the low speed ratio could be fixed within a broad range during manufacture, if desired, generally without increasing the overall size or complexity of the two-speed single reduction gear assembly.

A still further object of the invention is to provide a landing gear which is durable and simple to use.

These objects are obtained by the two-speed landing gear assembly for a semitrailer of the present invention, comprising, first and second vertically extendable and retractable supports or upright telescopic legs mounted in a laterally spaced relationship generally adjacent to a front end of said semitrailer; an input shaft rotatably mounted on said first leg, said input shaft being axially movable or translatable between a first position for high-speed operation and a second position for low-speed operation; an output shaft rotatably mounted on said first leg, said output shaft being axially parallel to said input shaft and spaced therefrom, said output shaft being operatively connected to an input shaft rotatably mounted on said second leg; a small radius pinion gear on said input shaft for transmitting rotary motion from said input shaft to said output shaft; an intermediate gear on said output shaft, said intermediate gear having teeth which are engaged by teeth of said pinion gear when said input shaft is in the second position for low-speed operation; a second gear on said output shaft, said second gear having a smaller diameter than said intermediate gear; a high-speed drive gear supported on said input shaft, said high-speed drive gear having means enabling synchronous rotation with the input shaft when the input shaft is in the first position for high-speed operation; and means for transmitting rotary motion from said output shaft to operate said telescopic legs.

BRIEF DESCRIPTION OF THE DRAWINGS

FIG. 5 is a side elevation view of a semitrailer shown disengaged from a truck tractor, and having the landing gear of FIG. 1 mounted thereon and supporting the front end of the semitrailer;

FIG. 5A is a view looking in the direction of arrows 5A of FIG. 5;

Similar numerals refer to similar parts throughout the drawings.

DETAILED DESCRIPTION OF THE INVENTION

Figure 2:
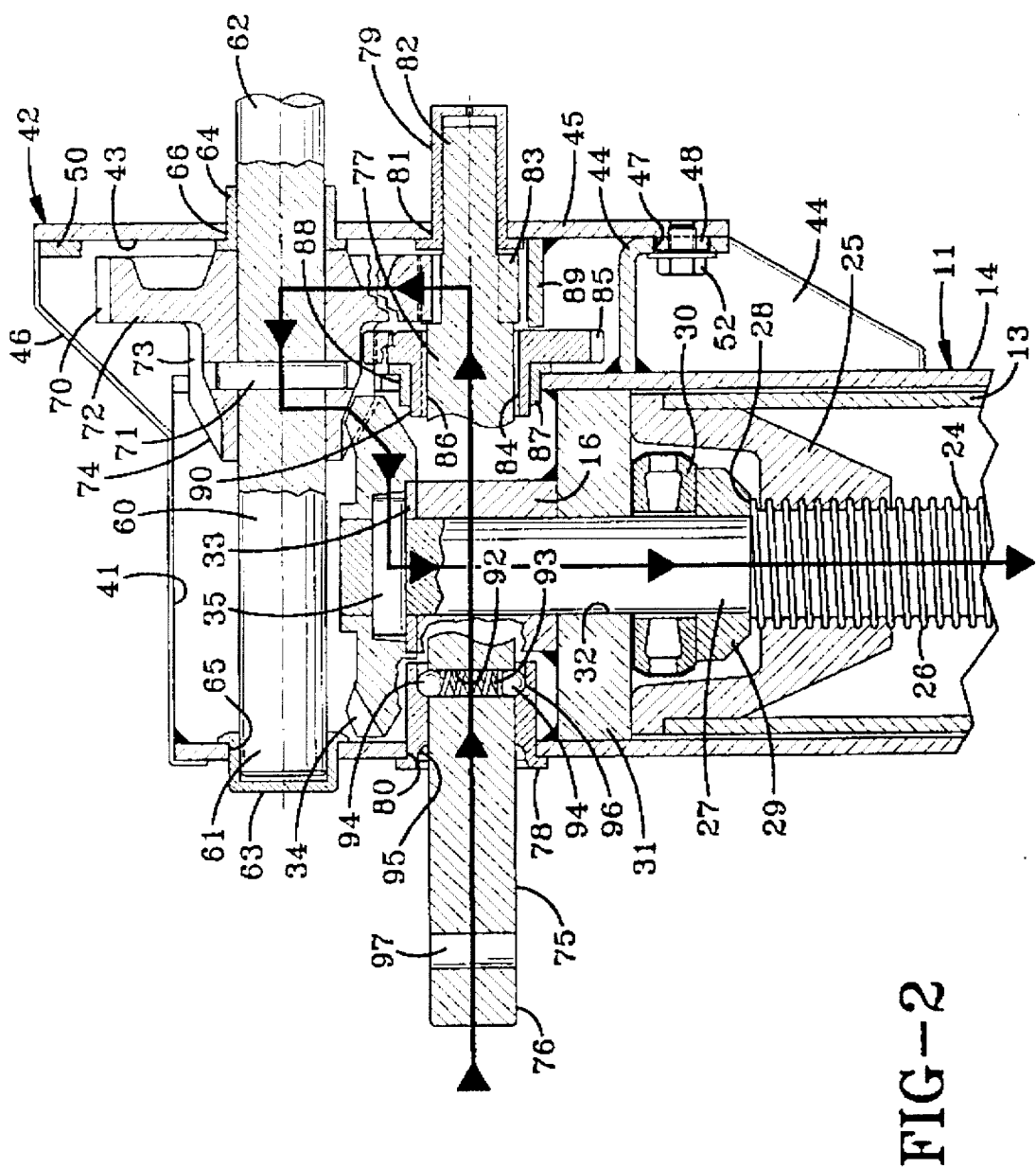
FIG. 2 is a section taken on line 2—2 of FIG. 1, showing the single reduction gear assembly engaged in low gear or the low speed position.
Figure 3:
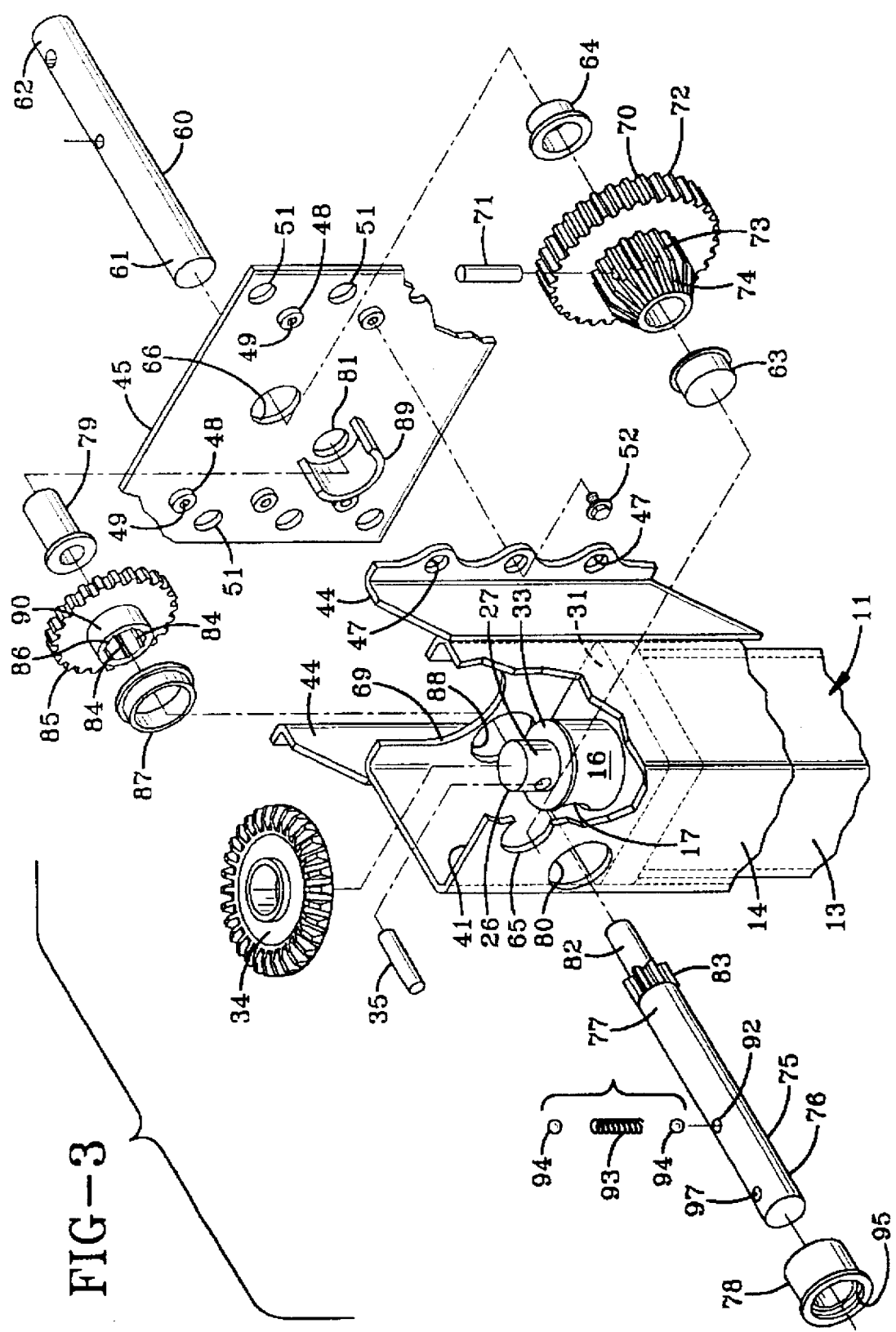
FIG. 3 is an exploded fragmentary perspective view, with portions broken away and hidden parts shown by dashed lines, of the gear assembly of FIG. 2.
Figure 5B:
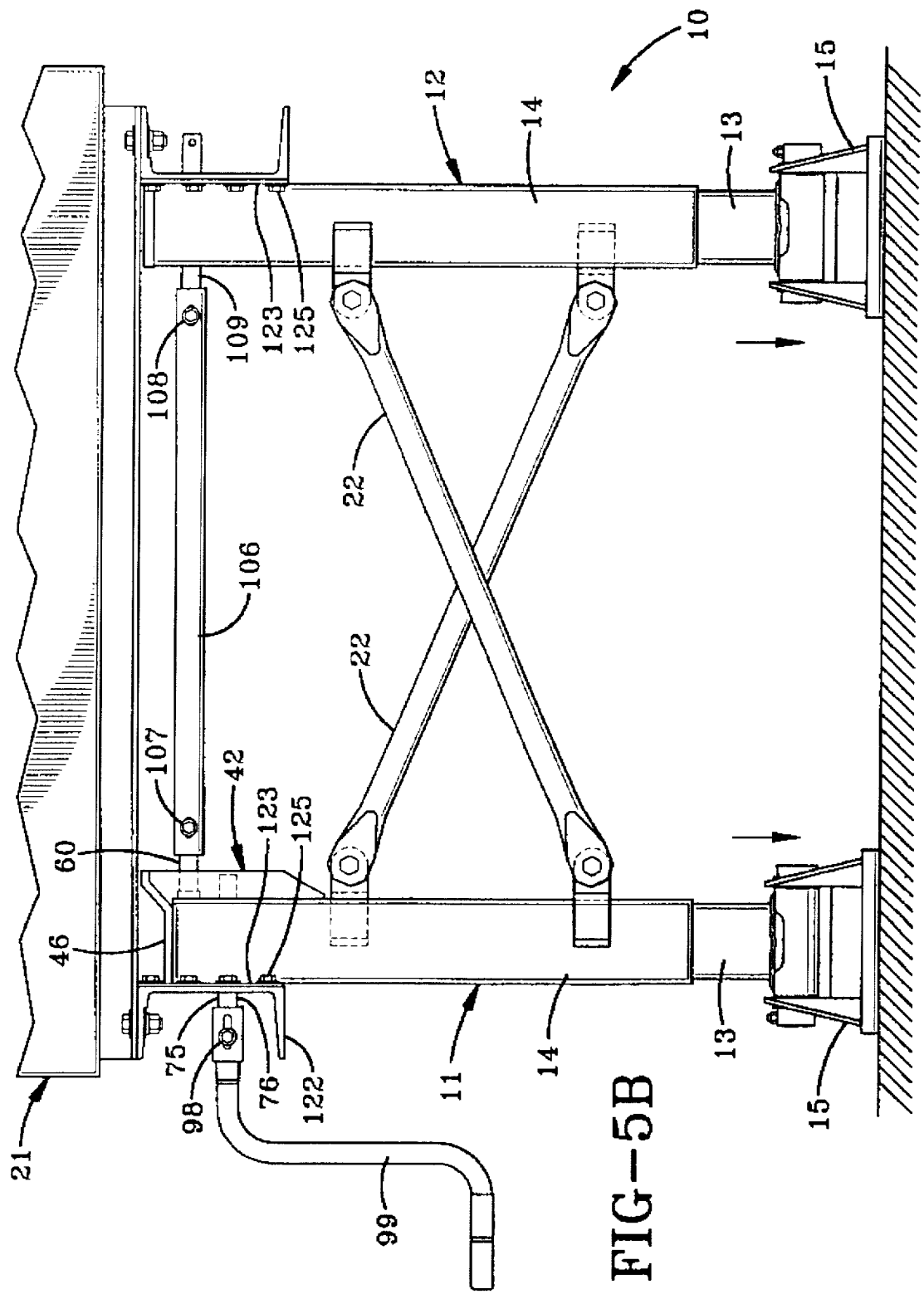
FIG. 5B is a view similar to FIG. 5A, showing the landing gear of FIG. 1A mounted on an inboard position on the semitrailer frame.

The landing gear for semitrailers of the present invention is shown in its intended use in FIGS. 5 and 5A and is indicated generally at 10. Landing gear 10 generally includes a pair of vertically extendable and retractable supports in the form of upright, spaced, parallel cranking and opposite-side legs 11 and 12, respectively, which depend from the front end of a semitrailer 21. In the embodiment shown in FIGS. 5 and 5A, cranking leg 11 is disposed on the left or driver's side of the semitrailer 21 and opposite-side leg 12 is positioned on the right or curb-side of the semitrailer. However, it is understood that cranking leg 11 could be placed on the curb-side of the semitrailer and opposite-side leg 12 could be placed on the driver's side without affecting the concept of the present invention. Hereafter, cranking side and opposite-side legs 11 and 12 will be referred to as the left or driver's side and right or curb-side legs, respectively. Each leg 11, 12 includes a lower tube 13 telescopically disposed (FIGS. 2, 3 and 6) within an upper tube 14, in a manner well known to the art and to the literature. A foot 15 is connected to the lower end of lower leg tube 13 in a conventional manner.

A pair of crossing transverse brace bars 22 (FIG. 5A) each is attached at one of its ends to a frame 20 of semitrailer 21 and at the other of its ends to an opposite leg 11, 12, respectively, for generally stabilizing the legs against side thrust forces and the like. A pair of longitudinal brace bars 23 (FIG. 5), each is attached at one of its ends to upper tube 14 of a respective one of legs 11, 12, and at the other of its ends to semitrailer frame 20.

Figure 4:
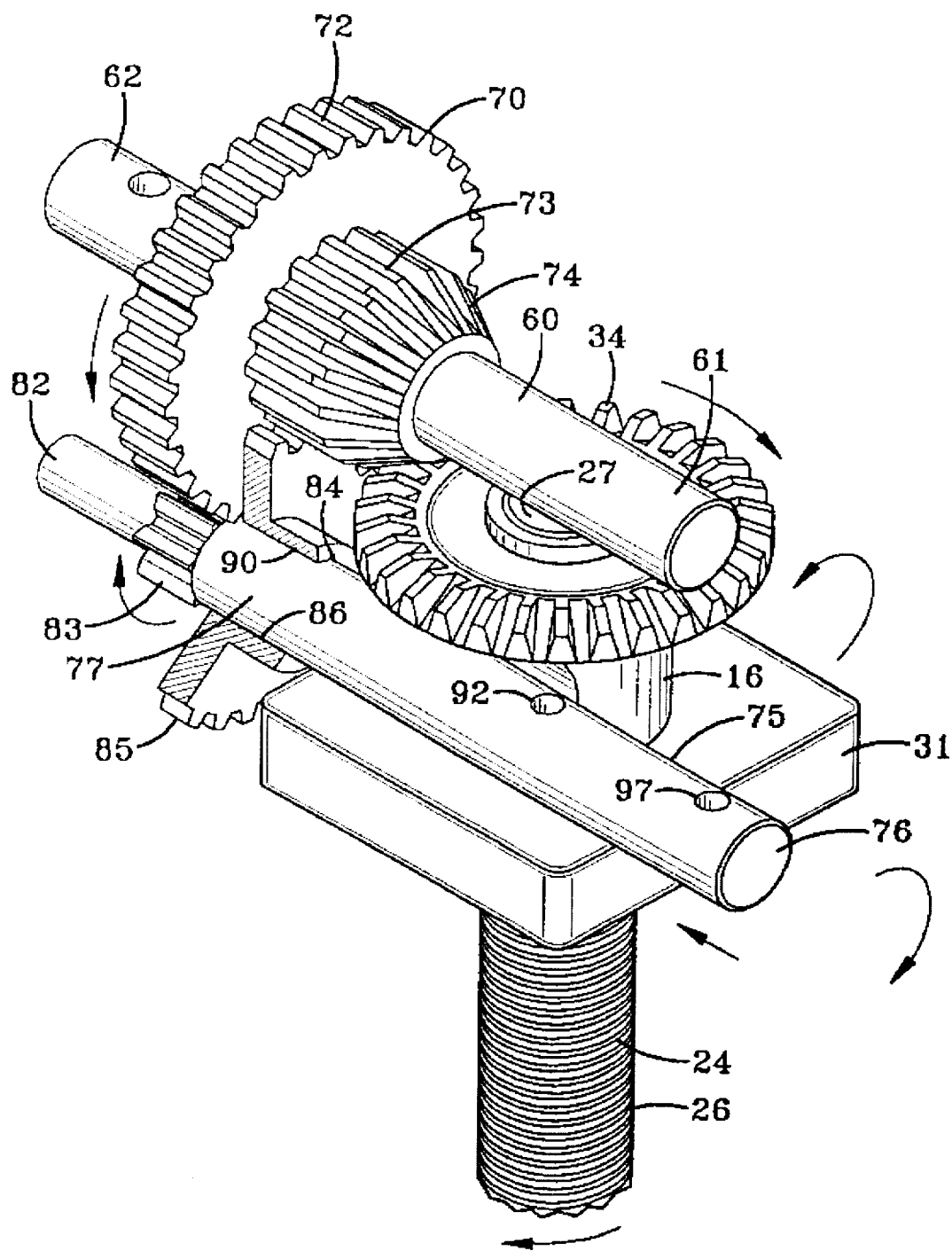
FIG. 4 is a fragmentary perspective view, with portions broken away, of the two-speed single reduction gear assembly of the landing gear of the present invention, showing the gears engaged in low gear as in FIG. 2.

With regard to the internal components of left or driver's side 11, a nut 25 is fixed on the upper end of lower leg tube 13 for threadably receiving a vertical elevating screw shaft 26 (FIGS. 2 and 4) which includes a threaded lower shaft 24 and a reduced diameter, integral unthreaded upper shaft 27. A shoulder 28 is formed at the interface of upper and lower shafts 27 and 24, respectively. An annular collar 29 bears on shoulder 28, and an annular thrust bearing 30 rests on collar 29 about upper shaft 27. A floor base 31 rests on bearing 30 (and nut 25) and is disposed about upper shaft 27 which passes through a continuous opening 32 formed in the floor base. Floor base 31 is welded to the inside surfaces of upper leg tube 14. An annular spacer 16 is welded to the top of floor base 31 about upper shaft 27. A hardened thrust washer 33 is disposed on upper shaft 27 and rests on the upper surface of spacer 16. A bevel gear 34 is slidably engaged on upper shaft 27, and rotary motion is transmitted to upper shaft 27 by a pin 35 which couples bevel gear 34 to the upper shaft in a manner familiar to those having ordinary skill in the art. Hardened thrust washer 33 provides a wear surface for contact by bevel gear 34 and coupling pin 35.

In accordance with one of the main features of the present invention, a metal gear case indicated generally at 42, together with the inboard wall of upper leg tube 14, generally define a gear case compartment 43 (FIGS. 1, 2, 3 and 5A) which is integral with the leg structure 11. More specifically, gear case 42 is comprised of four primary components, namely, a pair of bent metal flanges 44 attached by bead welds in a spaced relationship on the upper inboard portion of upper leg tube 14, a cover 45 and a cap 46. Cover 45 is formed with a plurality of raised bosses 48 which are alignable with and snugly fit within respective ones of a plurality of vertically spaced openings 47 formed in flanges 44. Each boss 48 is formed with a threaded recess 49 for threadably receiving screws 52 for securing cover 45 to flanges 44. Cap 46 is positioned over the upper open ends of upper leg tube 14 and gear case 42, and is secured thereon by any suitable means such as self-tapping screws (not shown). Cap 46, together with floor base 31 and the walls of upper leg tube 14 define an upper compartment 41 of upper leg tube 14. A gasket 50 of any suitable type such as one formed of an elastomeric material is placed or applied at the interface of cap 46 and upper leg tube 14 and cover 45 in a usual manner. Gasket 50 and cap 46, in cooperation with cover 45, bent metal flanges 44, and upper leg tube 14, effectively protect the two-speed single reduction gear assembly of landing gear 10 contained within upper compartment 41 and gear case compartment 43 of upper leg tube 14, from outside elements such as dirt, moisture, etc., which could interfere with the efficient operation of the gear assembly or transmission. The bent metal flanges 44 and cap 46 of gear case 42, due to the small number, size and compact orientation of the components contained therein, are formed by a metal bending process as compared to many prior art gear boxes which must be formed by more expensive metal stamping processes due to the larger number, size and/or less compact orientation of the components contained therein. More specifically, the components of the two-speed single reduction gear assembly or transmission of the landing gear of the present invention contained in gear case 42, are all generally adjacent to the inboard wall of upper leg tube 14, and in particular do not extend beyond the width of the outboard wall. Therefore, gear case bent metal flanges 44 and cap 46 formed by mere bending, together with gear case cover 45, cooperate with the inboard wall of upper leg tube 14 to adequately cover the components contained therein. In contrast, many prior art landing gear assemblies extend beyond the width of the adjacent upper leg tube, thus requiring, in many cases, a two-piece gear case which must be stamped or otherwise machined so that the two pieces fit together properly and adequately protect the components contained therein from outside elements. It also is important to note that cover 45 of gear case 42 has a dual function. More particularly, the outer or protruding ends of cover 45 are each formed with a plurality of vertically spaced openings 51 for receiving fastening means 18 such as bolts or the like, for attachment of leg 11 to an outboard surface 19 of frame 20 of semitrailer 21 (FIGS. 5 and 5A).

An output shaft 60 (FIGS. 2 and 4) has first and second ends 61 and 62 mounted in upper compartment 41 and gear case compartment 43 of upper leg tube 14, and extends outwardly therefrom in an inboard direction. First and second ends 61 and 62 of output shaft 60 are rotatably mounted in bushings 63 and 64, respectively, which in turn are frictionally fitted in aligned openings 65 and 66 formed in the outboard wall of upper leg tube 14 and in gear case cover 45. It should be noted that bushing 63 is closed on its outboard end and receives first end 61 of output shaft 60, while bushing 64 is formed with a continuous opening allowing second end 62 of output shaft 60 to pass therethrough in an inboard direction for operative connection with the gear assembly of curb-side leg 12. As shown in at least FIGS. 1, 1A, 1B and 2, the upper outboard wall is spaced apart from the inboard wall and has a vertical surface which is substantially free of an external exterior gear box.

An integral one-piece combination gear 70 is mounted on second end 62 of output shaft 60 within upper compartment 41 and gear case compartment 43 of upper leg tube 14, by a pin 71 in a conventional manner. More particularly, the combination gear includes an intermediate gear 72, a second gear 73 which is a reduced diameter gear with respect to intermediate gear 72 and is disposed abuttingly adjacent to the intermediate gear in an outboard direction, and bevel pinion 74 which in turn is formed abuttingly adjacent to and outboard from gear 73. As noted above, combination gear 70 extends between and is contained within upper compartment 41 and gear case compartment 43 of upper leg tube 14. Specifically, a cutout 69 (FIG. 3) is formed in the inboard wall of upper leg tube 14 for communication between upper compartment 41 and gear case compartment 43. Intermediate gear 72 of combination gear 70 is contained entirely within gear case compartment 43, bevel pinion 74 of combination gear 70 is contained entirely within upper compartment 41, and gear 73 disposed therebetween straddles cutout 69 and is partially contained within upper compartment 41 and gear case compartment 43.

An input shaft 75 having first and second ends 76 and 77, respectively, is slidably rotatably mounted in upper compartment 41 of upper leg tube 14 and in gear case compartment 43, and is disposed below and offset from output shaft 60. More specifically, a pair of bushings 78 and 79 are frictionally fitted in aligned openings 80 and 81, respectively, formed in the outboard wall of upper leg tube 14 and in gear case cover 45. Second end 77 of input shaft 75 terminates in a reduced diameter stud 82 which is slidably rotatably mounted in bushing 79 which is closed on its inboard end. Bushing 78 is formed with a continuous opening allowing first end 76 of input shaft 75 to pass therethrough and extend outwardly from upper leg tube 14 in an outboard direction. A pinion gear 83 is formed in second end 77 of input shaft 75 adjacent to reduced diameter stud 82. Spacer 16 is coped or provided with a transverse cylindrical recess which provides clearance for input shaft 75 to permit a compact structure wherein the input shaft and output shaft are supported on the inboard and outboard walls of leg 11 and between the forward and rearward walls of leg 11.

A high-speed drive gear 85 is supported on input shaft 75 and is formed with a hub 90 which extends outwardly from gear 85 in an outboard direction. Hub 90 in turn is formed with a continuous axial opening 86 and further has internal teeth or a plurality of axially extending spline slots 84 formed in its internal surface. Hub 90 is rotatably mounted in a bushing 87 which in turn is frictionally fitted in an opening 88 formed in the inboard wall of upper leg tube 14, wherein opening 88 is aligned with openings 80, 81, so that second end 77 of input shaft 75 is slidably rotatably mounted in continuous hub opening 86. Gear 85 is maintained in position, and in particular is prevented from moving in an inboard direction, by a spacer 89 welded to the outboard face of gear case cover 45. A transverse continuous cylindrical opening 92 is formed in a generally central portion of input shaft 75. A detent spring 93 having a detent ball 94 disposed on each of its ends is fitted within opening 92 for positively engaging first and second annular recesses 95 and 96, respectively, formed in the interior surface of bushing 78. A transverse continuous cylindrical opening 97 is formed in first end 76 of input shaft 75, for receiving a bolt 98 (FIG. 1) or other means for fastening a crank handle 99 to input shaft 75.

Figure 6:
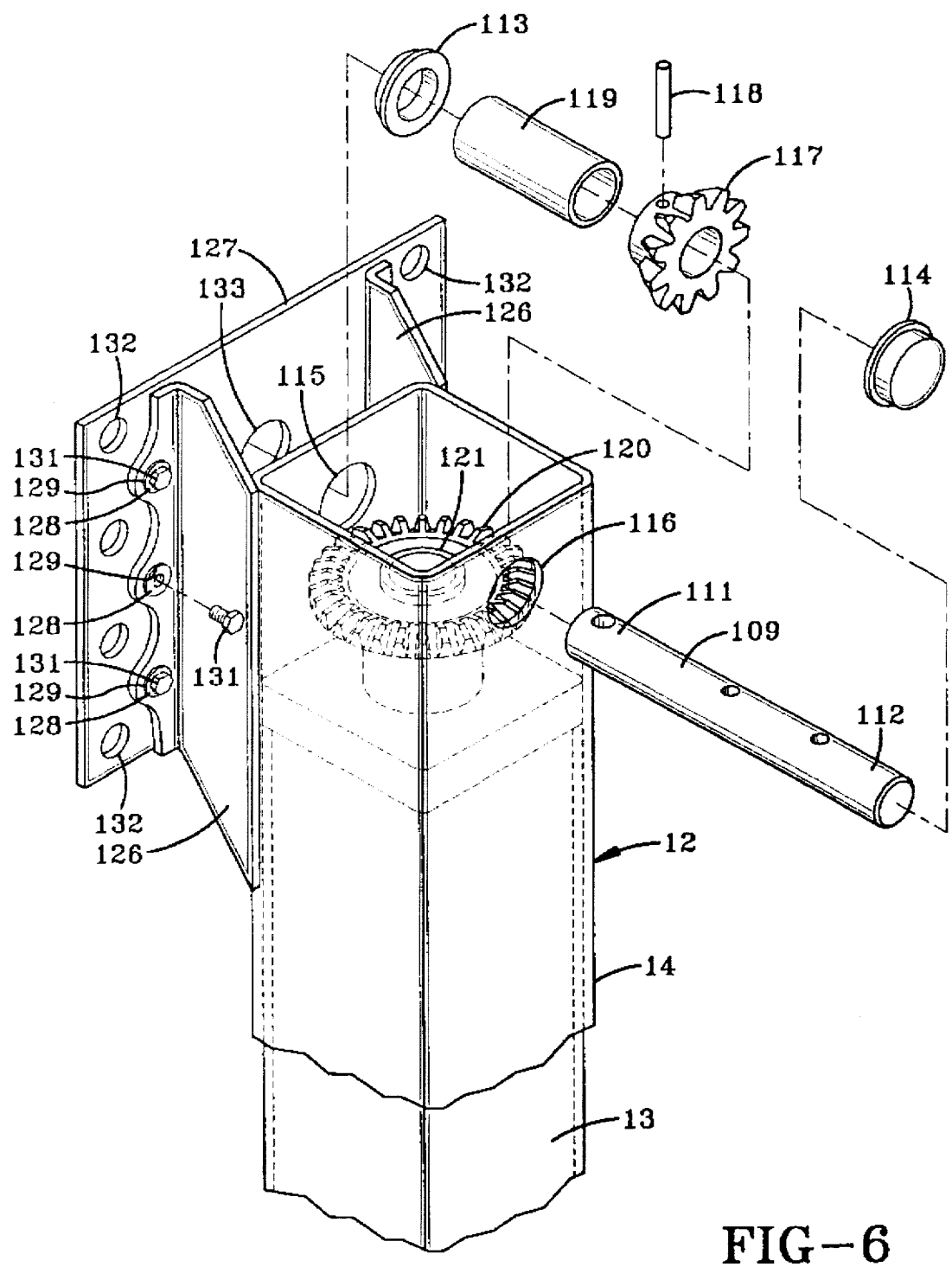
FIG. 6 is an exploded fragmentary perspective view, with hidden parts shown by dashed lines, of the gear assembly of the opposite-side leg of the landing gear of the present invention, shown adapted for mounting on an outboard position on a semitrailer frame.
Figure 6A:
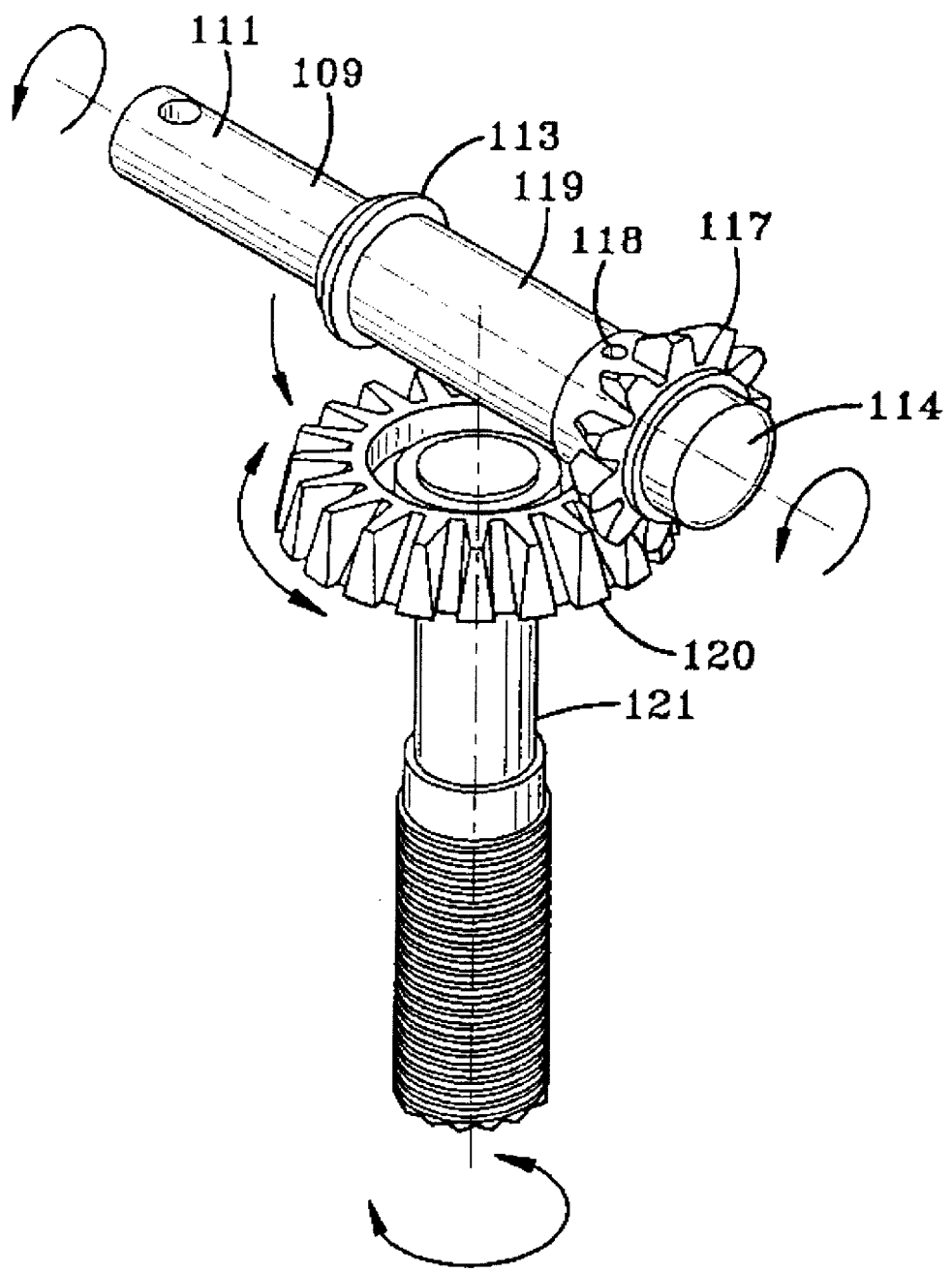
FIG. 6A is a fragmentary perspective view of the gear assembly of the opposite-side leg of FIG. 6, showing the manner in which the gears mesh.

As shown in FIG. 5A, a connecting shaft 106 extends between and is secured at each of its ends by fasteners 107 and 108 such as bolts or the like, to second end 62 of output shaft 60 of leg 11 and to an input shaft 109 of leg 12, respectively. The internal components contained in the right or curb-side leg 12 of landing gear are similar in many respects to those contained in the lower and upper leg tubes 13, 14 of left or driver's side leg 11, and are illustrated in FIGS. 6 and 6A. Input shaft 109 includes first and second ends 111 and 112, respectively, which are rotatably mounted in bushings 113 and 114, which in turn are frictionally fitted in aligned openings 115 and 116 formed in the inboard and outboard walls of upper leg tube 14. A bevel pinion 117 is securely mounted on second end 112 of output shaft 109 by a pin 118 in a conventional manner. A spacer tube 119 maintains bushings 113, 114 and bevel gear 117 in their intended positions to prevent lateral movement of input shaft 109. Bevel pinion 117 meshes with a bevel gear 120 which in turn is disposed on an elevating screw shaft 121 in a manner similar to bevel gear 34 of driver's side leg 11. The structure and manner of mounting screw shaft 121 in curb-side leg 12 is similar to that described above for the mounting of screw shaft 26 in driver's side leg 11, which is hereby fully incorporated by reference. Leg 12 is mounted on an outboard position on semitrailer frame 20 in the following manner. A pair of bent metal flanges 126 are attached by bead welds in a spaced relationship on the upper inboard portion of upper leg tube 14. A fastening plate 127 is formed with a plurality of raised bosses 128 which are alignable with and snugly fit within respective ones of a plurality of vertically spaced openings 129 formed in flanges 126. Each boss 128 is formed with a threaded recess (not shown) for threadably receiving screws 131 for securing fastening plate 127 to flanges 126. Fastening plate 127 also is formed with an opening 133 to allow for passage of input shaft 109 into leg 12. A cap is positioned over the upper open end of upper leg tube 14, and is secured thereon by any suitable means such as self-tapping screws (not shown), in a manner similar to that described above for leg 11. The outer or protruding ends of fastening plate 127 each is formed with a plurality of vertically spaced openings 132 for receiving fastening means 18 such as bolts or the like, for attachment of leg 12 to outboard surface 19 of frame 20 of semitrailer 21 (FIG. 5 and 5A).

Figure 1:
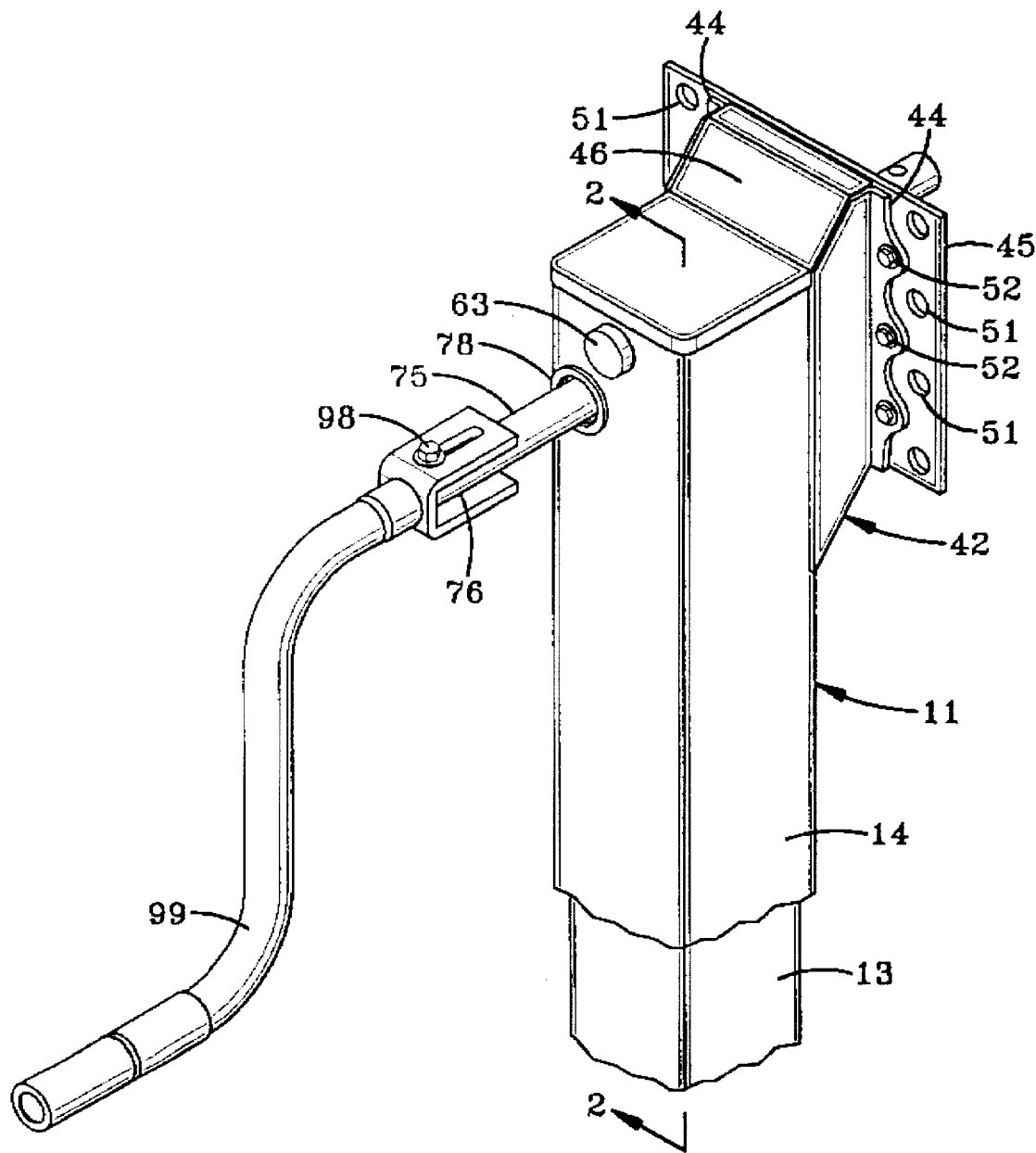
FIG. 1 is a fragmentary perspective view of the two-speed single reduction gear assembly of the cranking leg of the landing gear of the present invention, shown adapted for mounting on an outboard position on a semitrailer frame.
Figure 1A:
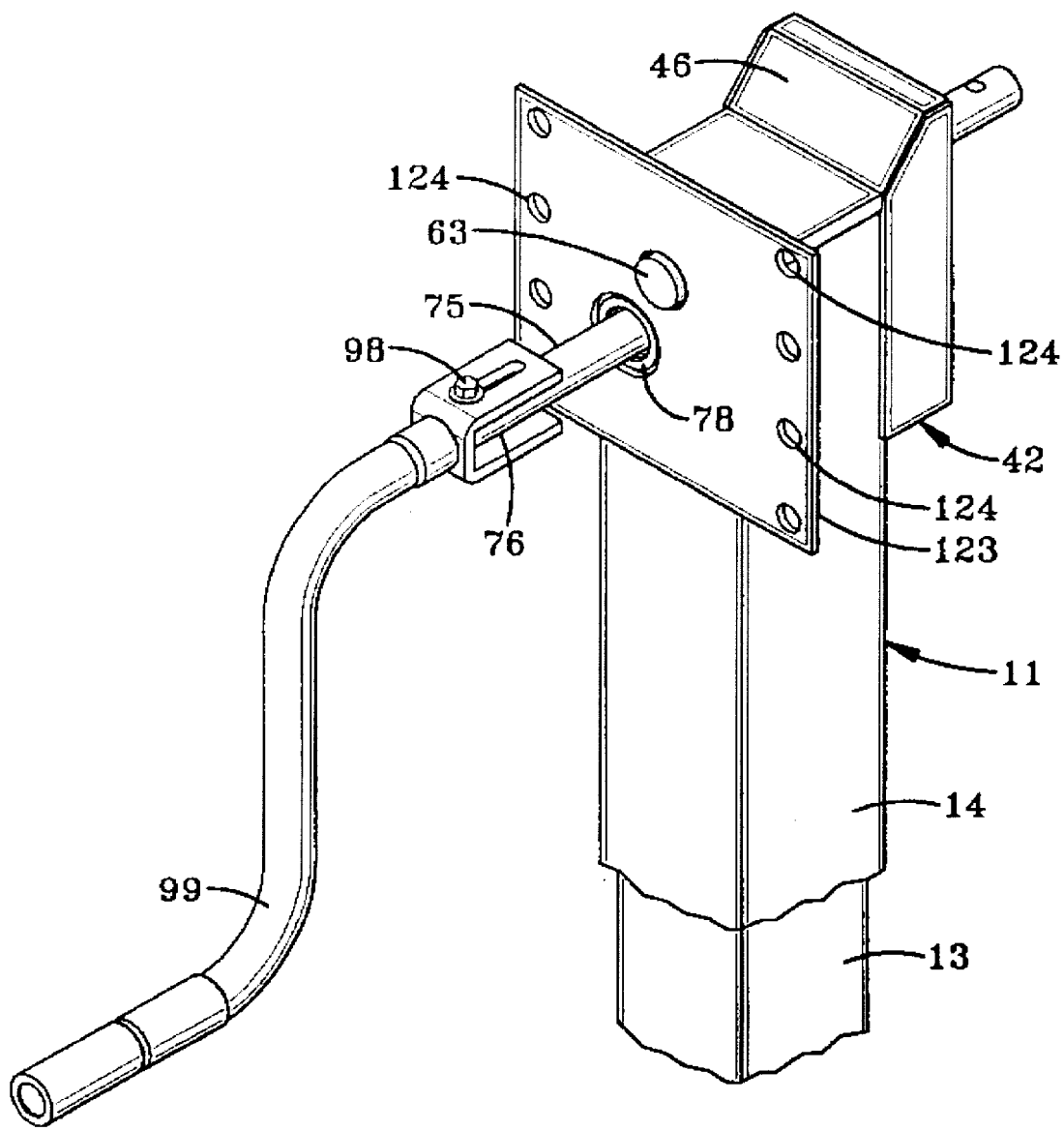
FIG. 1A is a fragmentary perspective view of the two-speed single reduction gear assembly of the cranking leg of the landing gear of the present invention, shown adapted for mounting on an inboard position on a semitrailer frame.
Figure 1B:
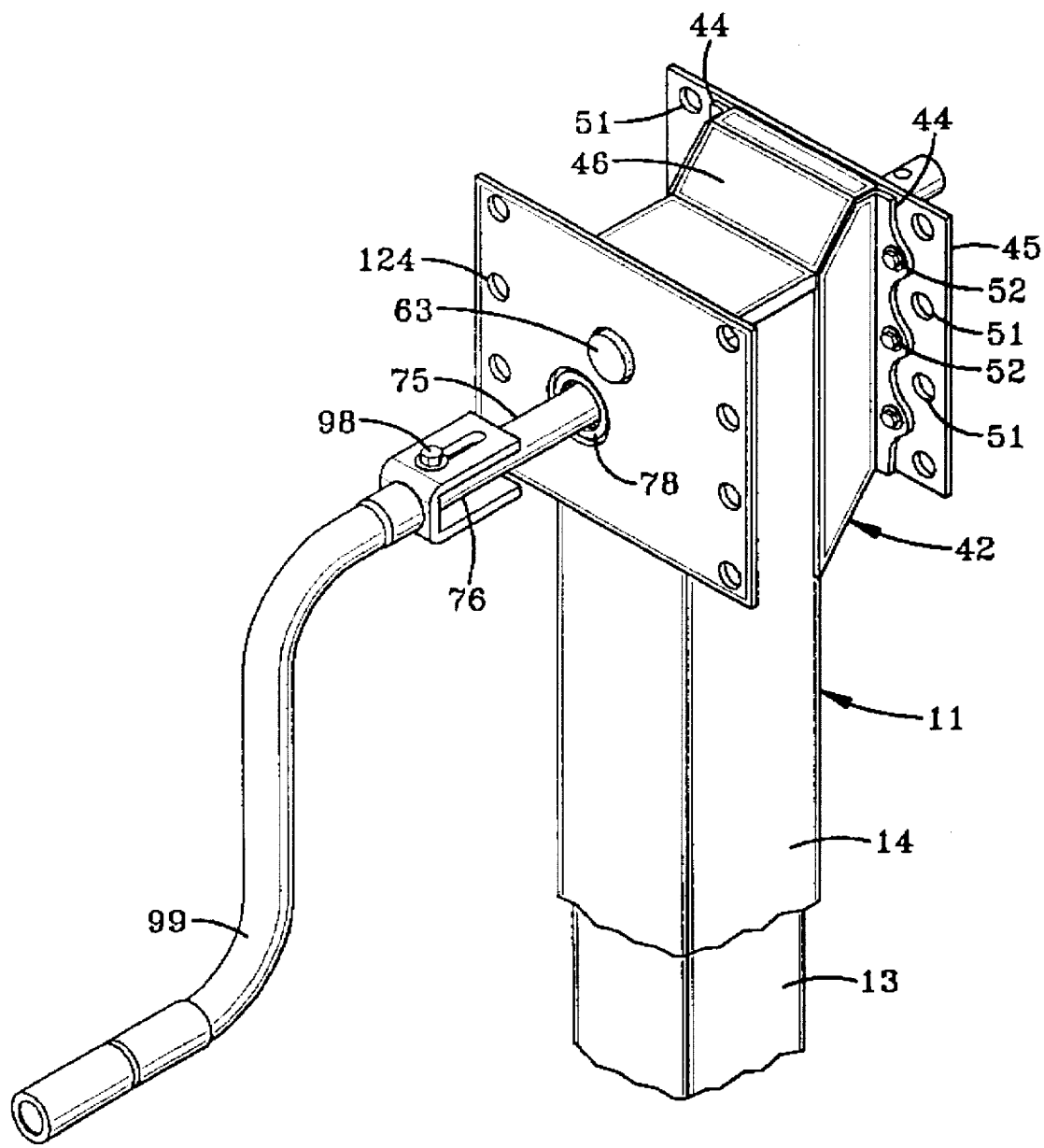
FIG. 1B is a fragmentary perspective view of the two-speed single reduction gear assembly of the cranking leg of the landing gear of the present invention, shown adapted for universal mounting either on an inboard or an outboard position on a semitrailer frame.

If it is desired to mount legs 11 and 12 on an inboard surface of a semitrailer frame (FIG. 5B), a flange plate 123 is attached to an outboard surface of upper leg tube 14 by any suitable means such as welding (FIG. 1A). Each protruding end of flange plate 123 is formed with a plurality of openings 124 for receiving fastening means 125 such as bolts or the like, for attachment of legs 11, 12 to semitrailer frame 122. If desired, legs 11 and 12 can each have the outboard and inboard mounting structures described above mounted thereon (FIG. 1B), so that legs 11 and 12 of landing gear 10 may be attached either to the outboard or inboard surfaces of a semitrailer frame.

Landing gear 10 of the present invention is operated in the following manner when it is desired to work the landing gear in low gear or low speed, wherein the ratio of turns of crank handle 99 to vertical distance of travel of legs 11, 12 is high, but wherein the mechanical advantage enjoyed by the operator of the landing gear also is high. More particularly, this ratio is from about 15 to about 50, desirably from about 20 to about 40, and preferably from about 25 to about 35 turns per inch, which generally are standard ratios. Landing gear 10 is shown in the low gear in FIGS. 2 and 4. To lower upper leg tube 14 with respect to lower leg tube 13 of the driver's side and curb-side legs 11 and 12, respectively, in low-speed, input shaft 75 is manually slidably moved to its inwardmost position by applying a pushing force to crank handle 99, so that detent balls 94 are positively engaged with second annular recess 96. Crank handle 99 and attached input shaft 75 then are manually rotated in a clockwise direction as shown by the arrow in FIG. 4, whereby pinion gear 83 meshes with the teeth of intermediate gear 72 of combination gear 70 for rotating the intermediate gear in a counterclockwise direction. In transmitting the rotary motion of input shaft 75 from pinion gear 83 to intermediate gear 72, a single reduction having a magnitude of, for example, about 6.6:1 is achieved. As is well known to those of ordinary skill in the art, in practical terms, such a reduction means that intermediate gear 72 is rotating about 6.6:1 times slower than input shaft 75, but a gain in mechanical advantage of a magnitude of about 6.6 is at the same time realized by the operator of landing gear 10. That is, due to the reduction achieved in transmitting rotary motion from pinion gear 83 to intermediate gear 72, the operator will find that crank handle 99 is about 6.6 times easier to turn than without such a reduction. Attached counterclockwise rotating bevel pinion 74 meshes with bevel gear 34 to rotate the bevel gear and attached screw shaft 26 in a clockwise direction.

A second reduction having a magnitude of, for example, about 2:1 occurs in going from bevel pinion 74 to bevel gear 34, resulting in an overall reduction of 13.3, meaning that screw shaft 26 turns about 13.3 times slower than input shaft 75 in low gear. However, landing gear 10 of the present invention would be customarily referred to in the art and literature as a single reduction assembly based on the reduction which takes place in gear case compartment 43 between pinion gear 83 and intermediate gear 72. Most prior art landing gear have a single or double reduction which takes place in the gear case, as well as another reduction which takes place at the junction of the output shaft and the elevating screw shaft. However, such landing gear generally are identified as single reduction or double reduction based on the number of reductions which take place exclusive of the reduction at the junction of the output shaft and elevating screw shaft. Therefore, the total reduction of about 13.3, when combined with the screw lead pitch of about 2.25 of threaded lower shaft 24 of elevating screw shaft 26, results in a low gear ratio of crank handle turns to vertical travel distance of 13.3 times about 2.25 equalling about 30 turns per inch. This means that, in low gear, for every 30 turns of crank handle 99, screw shaft 26 will travel one inch in vertical distance. Although screw shaft 26 is turning about 13.3 times slower than input shaft 75, the operator enjoys a theoretical mechanical advantage of a magnitude of about 30. For a typical crank handle having, for example, about a 16-inch lever (as measured by the radial displacement of the handle 99 from the rotational axis of the input shaft 75), the handle moves circumferentially through a distance of about 100 inches per revolution, which means that crank handle 99 theoretically turns about 3,000 times easier than it would without the landing gear mechanism. After frictional losses are accounted for, the net mechanical advantage of the entire mechanism is about 900 to 1. Rotation of screw shaft 26 in nut 25 in the counterclockwise direction causes upward movement of the screw shaft in the nut resulting in retraction of lower leg tube 13 within upper leg tube 14.

The foregoing example is only illustrative; the gear reduction between the pinion gear 83 and the intermediate gear can typically range from about 2:1 or 2.5:1 to about 8:1. Similarly, the second reduction between the bevel pinion 74 and bevel gear 34 can typically range from about 1.5:1 to about 2.5:1 Likewise, the effective screw pitch of 2.25 is only illustrative; with typical screw pitches ranging from 1.5 turns per inch to 4 turns per inch. Effective screw pitch refers to the number of screw revolutions required to achieve an axial screw displacement of one inch.

Output shaft 60 simultaneously rotates connecting shaft 106 in a clockwise direction, which in turn rotates input shaft 109 of leg 12 in a clockwise direction as shown in FIG. 6A. Attached clockwise-rotating bevel pinion 117 meshes with bevel gear 120 to rotate the bevel gear and attached screw shaft 121 in a counterclockwise direction in a manner similar to the rotation of screw shaft 26 of driver's side leg 11, for retracting lower leg tube 13 with respect to upper leg tube 14. Of course, it is understood that rotation of crank handle 99 in the opposite or counterclockwise direction results in opposite movement of all of the above-described components of landing gear 10, which in turns results in extension of lower leg tube 13 from upper leg tube 14 in both legs 11, 12.

Figure 2A:
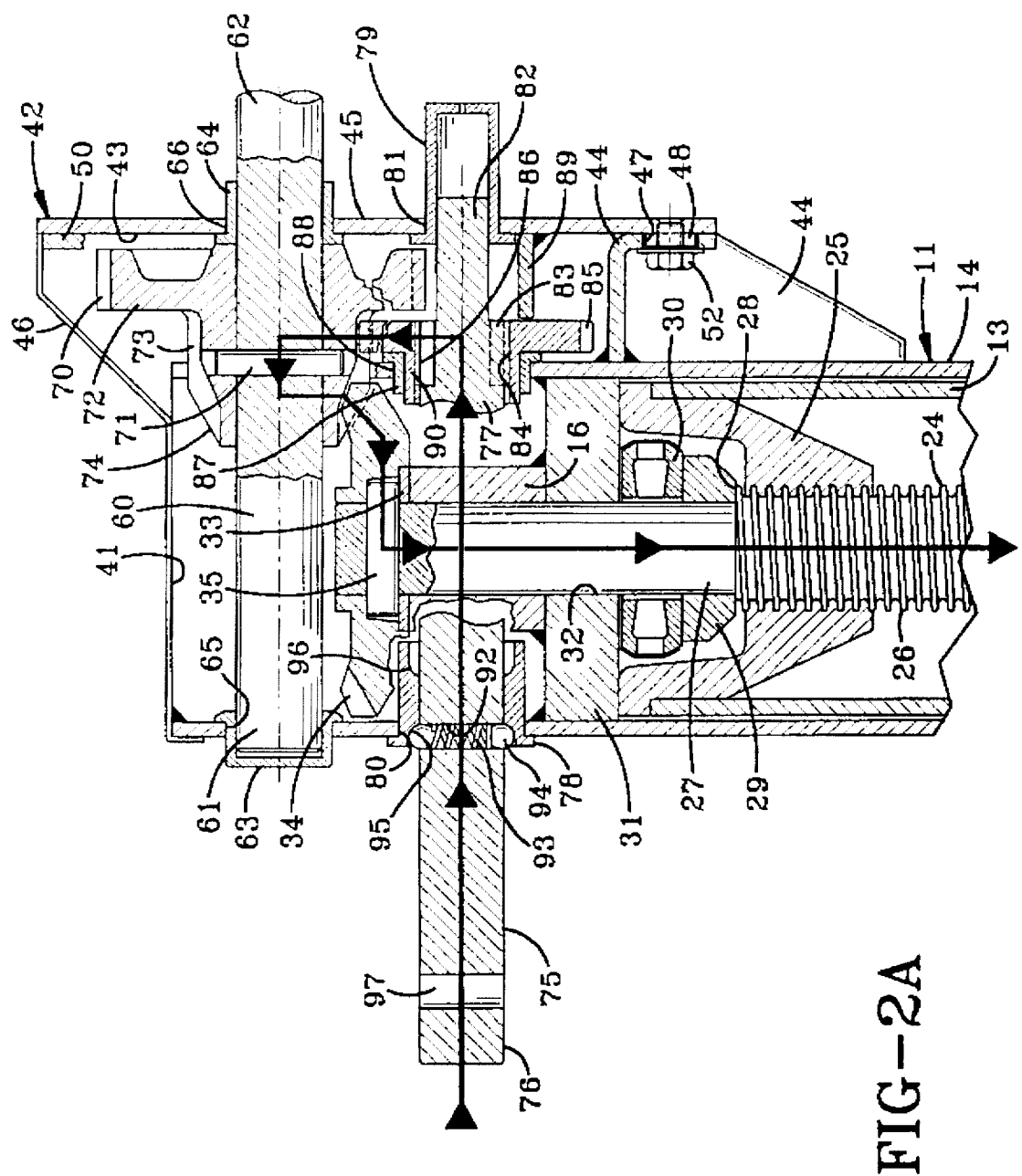
FIG. 2A is a view similar to FIG. 2, showing the gear assembly shifted outwardly and engaged in high gear or the high speed position.

In accordance with another of the main features of the present invention, when it is desired to work landing gear 10 in high gear or high-speed, wherein the ratio of turns of crank handle 99 to vertical distance of travel of legs 11, 12 is low, but wherein the mechanical advantage realized by the operator also is low, the landing gear is operated in the following manner. The high gear ratio is from about 2 to about 5, desirably from about 3 to about 4.5, and preferably from about 4 to about 4.5 turns per inch, which generally are standard ratios. Landing gear 10 is shown in high gear in FIGS. 2A and 4A. To lower upper leg tube 14 with respect to lower leg tube 13 of the driver's side and curb-side legs 11 and 12, respectively, in high speed, input shaft 75 is manually slidably moved to its outwardmost position by applying a pulling force to crank handle 99, so that detent balls 94 disengage from second annular recess 96 and positively engage first annular recess 95. Such outward movement of input shaft 75 from the inwardmost position shown in FIGS. 2 and 4 to the outwardmost position shown in FIGS. 2A and 4A causes pinion gear 83 to retract within continuous opening 86 of hub 90 of gear 85, whereby the outer ends of the gear teeth of pinion gear 83 function as splines to slidably engage the internal teeth or spline slots 84 formed in the hub. It is important to note that the relatively small size of pinion gear 83, which must be moved through heavy lubricating grease contained in gear case compartment 43 during shifting between gear speeds, results in an apparatus with improved shifting ease. More particularly, this grease offers resistance to the movement of pinion gear 83 therethrough, and makes such movement particularly difficult in cold weather conditions when the grease is more viscous. However, the small size of pinion gear 83 relative to many prior art gears which must be shifted through such lubricating grease, substantially reduces the effect of the grease resistance. Moreover, the relatively short horizontal distance between first and second annular recesses 95 and 96 of about ⅝ inch, which is less than many prior art devices which require an inward movement of a gear a distance of about 1¼ inch to accomplish a similar shift from one gear speed to another gear speed, also aids in improving the shifting ease of the apparatus of the present invention. Thus, such a spline shifting or "clutch shifting" apparatus is more efficient than many known prior art landing gear shifting apparatus, including "constant gear mesh" designs.

Figure 4A:
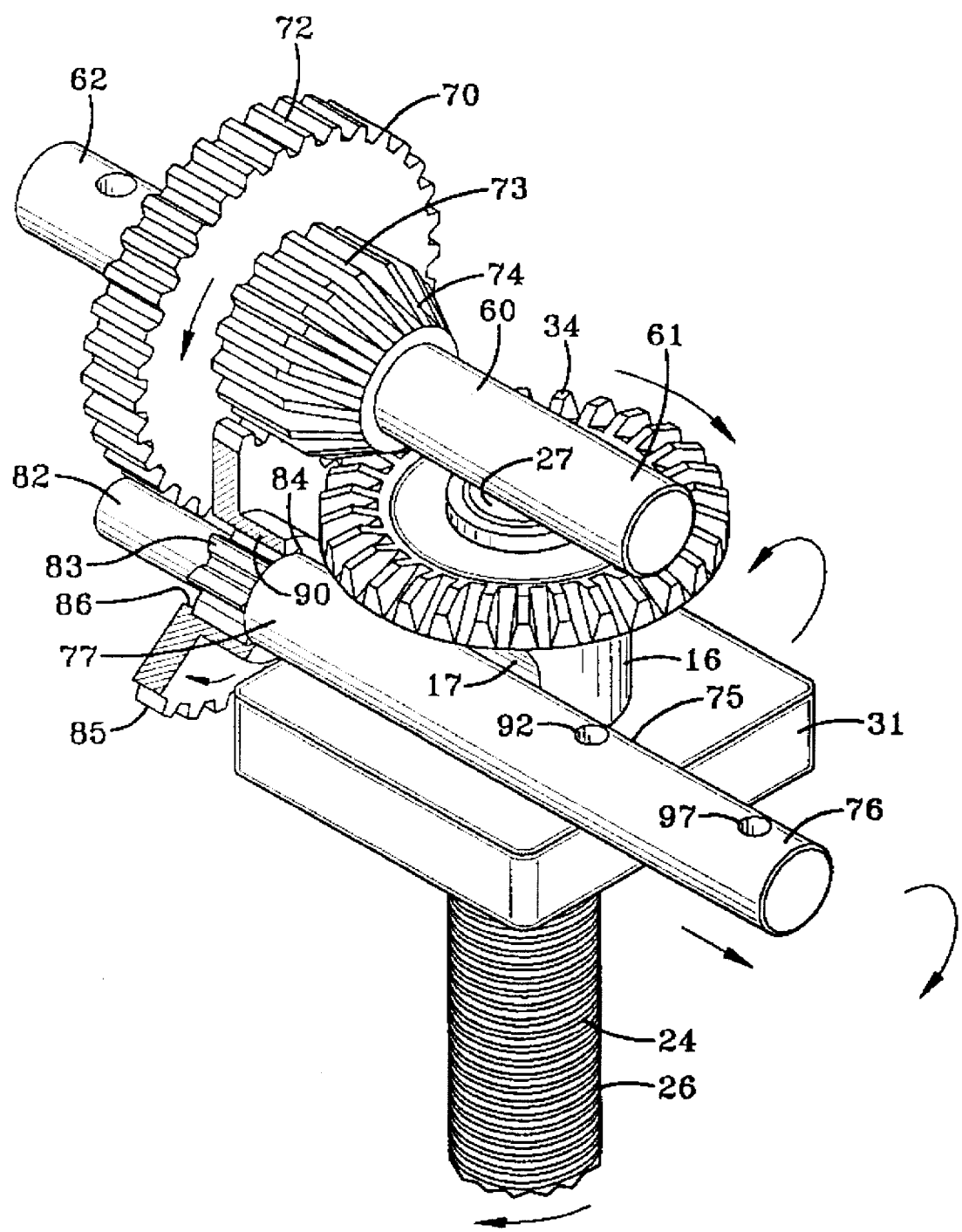
FIG. 4A is a view similar to FIG. 4, showing the gear assembly engaged in high gear as in FIG. 2A.

Crank handle 99 then is manually rotated in a clockwise direction as shown in FIG. 4A whereby clockwise rotating input shaft 75 rotates attached pinion gear 83 in a clockwise direction, which in turn rotates engaged hub 90 of gear 85. Clockwise rotating gear 85 in turn meshes with and rotates gear 73 of combination gear 70, which in turn rotates output shaft 60 and attached bevel pinion 74 in a counterclockwise direction. Bevel pinion 74 meshes with bevel gear 34 to rotate the bevel gear and attached screw shaft in a counterclockwise direction. As discussed above, the reduction in going from bevel pinion 74 to bevel gear 34 can, for example, be of a magnitude of about 2:1, which is the only reduction or only significant reduction, which occurs in high gear. The gear ratio between the high-speed drive gear 85 and gear 73 is typically from about 1:1 to about 0.6:1, with a gear ratio of about 1:1 being preferred. A 2:1 gear reduction between the bevel pinion 74 and bevel gear 34 and a 1:1 gear ratio between the high-speed gear 85 and gear 73, when combined with a screw lead pitch of about 2.25 of threaded lower shaft 24 of elevating screw shaft 26, results in a high gear ratio of crank handle turns to vertical travel distance of about 2 times about 2.25, equalling about 4.5 turns per inch. More specifically, this means that in the high gear, for every 4.5 turns of crank handle 99, screw shaft 26 travels about one inch in a vertical direction, or faster than in low gear. However, it should be noted that when landing gear 10 is in high gear or high-speed, the operator conversely only enjoys an overall theoretical mechanical advantage of a magnitude of about 450 with screw shaft 26 turning only about 2 times slower than input shaft 75, as compared to a theoretical mechanical advantage of about 3000 in low gear. The net mechanical advantage of the mechanism after accounting for frictional losses is about 135 in high gear. Rotation of screw shaft 26 in nut 25 in the counterclockwise direction causes downward movement of the screw shaft in the nut resulting in retraction of lower leg tube 13 and upper leg tube 14. Operatively connected curb-side leg 12 simultaneously operates in a similar manner as described above for the description of the operation of landing gear 10 in low speed. Of course, it is understood that rotation of crank handle 99 in the opposite or counterclockwise direction results in opposite movement of all of the above-described components of landing gear 10, which in turn results in extension of lower leg tube 13 from upper leg tube 14 in both legs 11, 12.

Preferably, the ratio of turns of the input shaft to inches of travel of the telescoping legs is from about 4 to about 6 in high gear, and from about 18 to about 35 in low gear.

It should be noted and is understood that depending on whether screw shaft 26 and nut 25 are threaded in a right-hand or left-hand direction, rotation of crank handle 99 in a given direction will cause lower leg tube 13 either to retract within or extend from upper leg tube 14.

Figure 7:
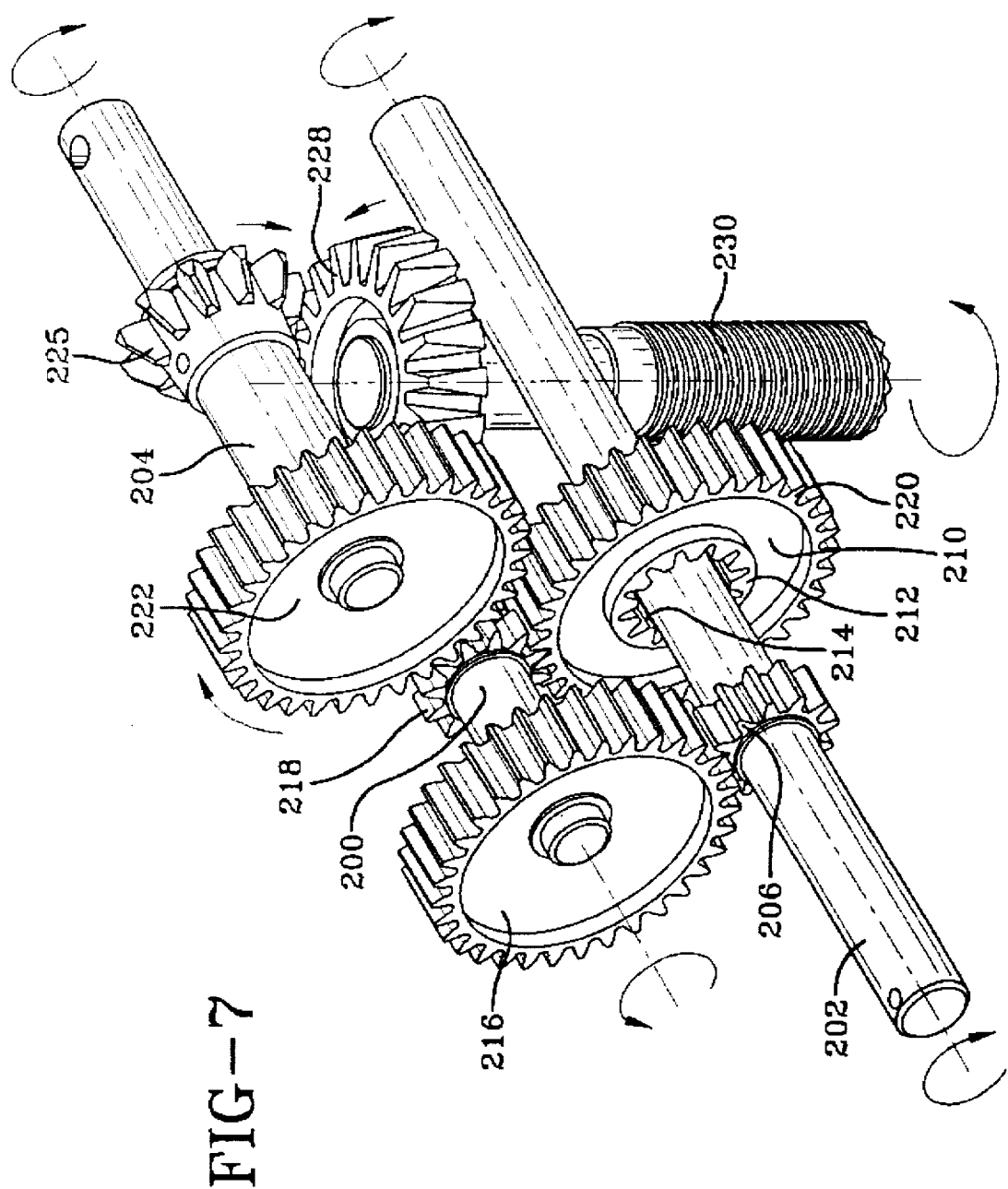
FIG. 7 is a side elevation view of an alternative embodiment of the invention including an input shaft, an output shaft, and an intermediate shaft, with the input shaft shown at a position corresponding to low-speed operation.
Figure 7A:
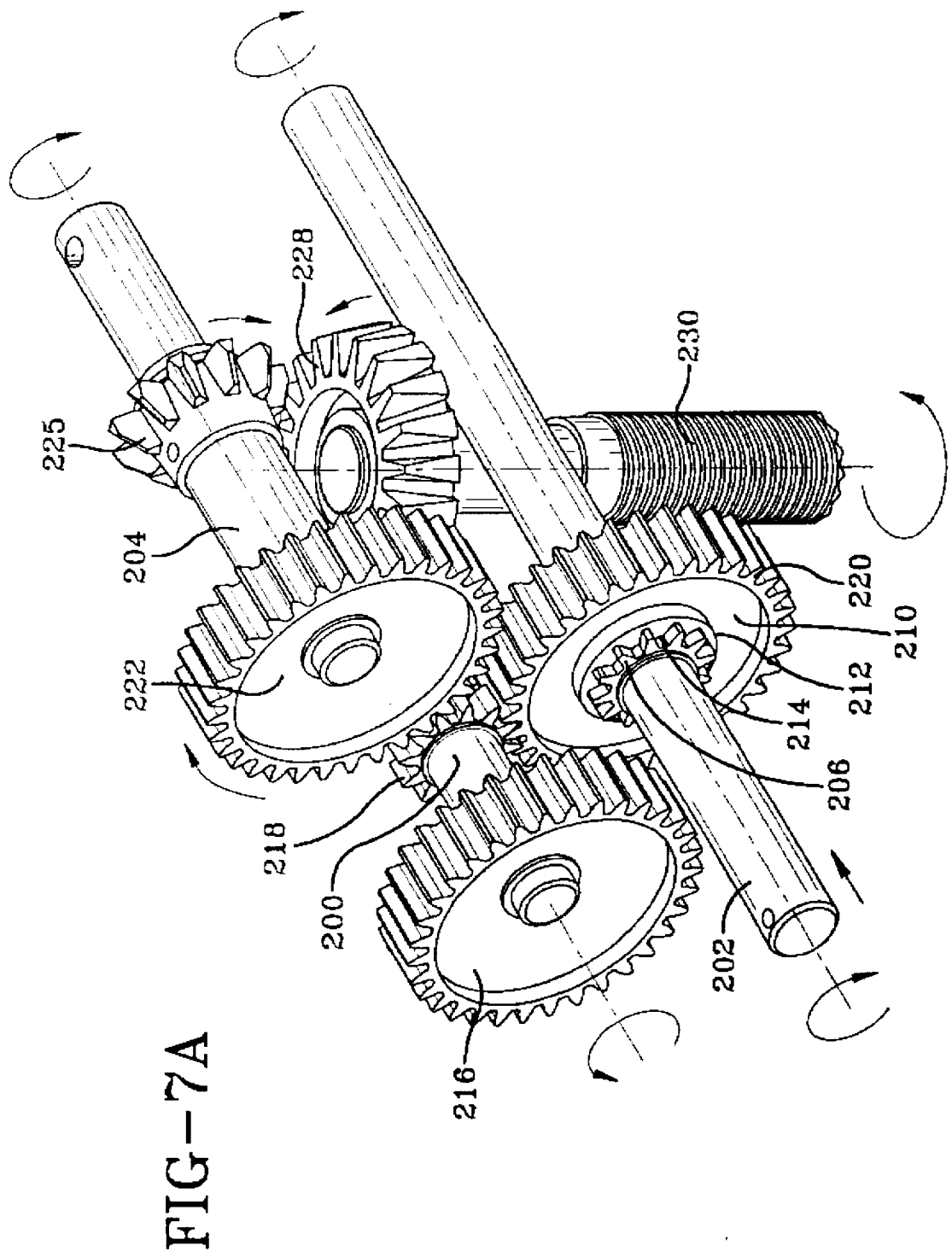
FIG. 7A is a view similar to FIG. 7, showing the input gear in a position corresponding to high-speed operation.

While the present invention has been described in detail relative to the preferred embodiment of the transmission or gear assembly which includes parallel input and output shafts wherein the output shaft has a bevel pinion 74 which engages bevel gear 34 to cause rotation of screw shaft 27, it will be readily appreciated by those having ordinary skill in the art that additional shafts can be added to take advantage of the improved shifting ease of the invention without departing from the spirit and scope of the invention. Specifically, one of the important features of the invention is the use of an axially movable input shaft 75 having attached in fixed relationship thereto a relatively small radius pinion gear 83 which together can be easily moved such as through heavy lubrication grease to allow easy shifting between low and high speed operation. As can be seen, for example in FIGS. 7 and 7A, the ease of shifting and other attributes of the invention can be achieved in a multiple shaft arrangement wherein an intermediate shaft 200 is used to operatively couple an input shaft 202 to an output shaft 204. The input shaft 202 is generally similar to the previously described input shaft 75 and includes a pinion gear 206 (generally analogous to pinion gear 83) which is secured in fixed relationship to input shaft 202. A high-speed drive gear 210 is supported on input shaft 202 in a manner generally similar to the manner in which gear 85 is supported by shaft 75 for the previously described embodiment. Gear 210 is formed with a hub 212 having internal gear teeth 214 or a plurality of spline slots which mesh with the teeth of pinion gear 206 when shaft 202 is in the position for high speed operation as shown in FIG. 7A. Intermediate shaft 200 includes a larger diameter gear 216 having teeth which mesh with the teeth of pinion gear 206 when shaft 202 is in the position for low-speed operation as shown in FIG. 7. Intermediate shaft 200 also includes a smaller diameter gear 218 having teeth which mesh with external teeth 220 of high-speed drive gear 210 and with teeth of gear 222 on output shaft 204. Output shaft 204 also has a bevel pinion 225 fixedly secured thereto which is similar to the bevel pinion 74 of the preferred embodiment shown in FIGS. 2–4A and which has teeth which mesh with the teeth of a bevel gear 228 fixed to a screw shaft 230 for raising and lowering of the telescoping legs. The alternative embodiment shown in FIGS. 7 and 7A is generally analogous to the preferred embodiment shown in FIGS. 1–6A except for the inclusion of an additional shaft 204 and gear 222.

In summary, important features of the present invention include a landing gear for semitrailers having a two-speed single reduction gear assembly, in which the gear assembly is comprised of fewer, smaller and simpler parts mounted on and about vertically offset input and output shafts, resulting in an easy to manufacture and assemble, compact, low-cost landing gear unit. This reduction in the number, size and complexity of parts results in an easy to crank and shift unit capable of achieving standard crank-handle turn to vertical leg travel distance ratios, wherein the low speed ratio could be fixed within a broad range during manufacture of the unit, if desired, without substantially increasing the overall size or complexity of the two-speed single reduction gear assembly. The landing gear of the present invention is durable and simple to use, and can include a universal mounting feature.

While in accordance with the patent statutes the best mode and preferred embodiment has been set forth, the scope of the invention is not limited thereto, but rather by the scope of the attached claims.

What is claimed is:

1. A two speed landing gear assembly for a semitrailer, comprising:

first and second upright telescopic legs mounted in a laterally spaced relationship generally adjacent to a front end of said semitrailer and said first leg including an inboard wall opposing said second leg and a spaced apart outboard wall including an exterior vertical surface;

a first shaft rotatably mounted on said first leg, said first shaft being axially movable between a first position for high-speed operation and a second position for low-speed operation;

a second shaft rotatably mounted on said first leg, said second shaft being axially parallel to said first shaft and spaced therefrom;

a pinion gear on said first shaft for transmitting rotary motion from said first shaft to said second shaft;

a first gear on said second shaft, said first gear having teeth which are engaged by teeth of said pinion gear when said first shaft is in the second position for low-speed operation;

a second gear on said second shaft, said second gear having a smaller diameter than said first gear;

a high-speed drive gear supported on said first shaft, said high-speed drive gear having an axial opening with a plurality of axially extending spline slots on its internal surface, said spline slots being configured so that the teeth of said pinion gear engage the spline slots of said high-speed drive gear and the teeth of said high-speed drive gear mesh with teeth of said second gear on said second shaft when said first shaft is in said first position for high-speed operation;

means for transmitting rotary motion from said second shaft to operate said telescopic legs; and said exterior vertical surface being substantially free from an external exterior gearbox.

2. The assembly of claim 1, wherein a gear reduction of from about 2:1 to about 8:1 is achieved between said pinion gear and said first gear on said second shaft when said first shaft is in said second position for low-speed operation.

3. The assembly of claim 2, wherein a gear ratio of from about 1:1 to about 0.6:1 is achieved between said high-speed drive gear and said second gear on said second shaft when said first shaft is in said first position for high-speed operation.

4. The assembly of claim 3, wherein said means for transmitting rotary motion from said second shaft to operate said telescoping legs includes a bevel pinion mounted on said second shaft, a bevel gear mounted on an upper end of an upright elevating screw shaft which is mounted within said first leg, a bevel pinion mounted on said second leg, and a bevel gear mounted on an upper end of an upright elevating screw shaft mounted within said second leg; wherein each of said bevel pinions mesh with a corresponding one of said bevel gears attached to a corresponding one of said elevating screw shafts to simultaneously operate each of said telescoping legs when said second shaft is caused to rotate.

5. The assembly of claim 3, wherein said first gear on said second shaft, said second gear on said second shaft, and said bevel pinion mounted on said second shaft are integrated into a one-piece combination gear, with said second gear being disposed abuttingly adjacent to said first gear, and said bevel pinion being disposed abuttingly adjacent to said second gear.

6. The assembly of claim 5, wherein a metal gear box encases said pinion gear of said first shaft mounted on said first leg, said one-piece combination gear, and said high-speed drive gear; and wherein the gear box and components encased therein are generally adjacent to said inboard wall and are disposed inboard of said outboard wall.

7. The assembly of claim 6, further comprising a crank handle secured to the outboard end of said first shaft mounted on said first leg for manual rotation of said first shaft, wherein an intermediate portion of said first shaft mounted on said first leg is formed with a transverse continuous cylindrical opening containing a detent spring and detent balls, wherein a sleeve is mounted on an outboard face of said gear case in alignment with an opening formed in said gear case, said sleeve having outboard and inboard annular recesses formed in an internal surface thereof, said outboard and inboard recesses being spaced apart, wherein said detent balls engage said outboard and inboard annular recesses when said first shaft is in the first position and second position, respectively, for high-speed and low speed operation, respectively.

8. The assembly of claim 7, wherein a flange plate is mounted on an inboard portion of each of said first and second legs for mounting said landing gear assembly on an outboard surface of a semitrailer frame.

9. The assembly of claim 7, wherein a flange plate is mounted on an outboard portion of said gear case and forms the outboard portion of said gear case and is mounted on an outboard portion of said second leg, for mounting said landing gear assembly on an inboard surface of a semitrailer frame.

10. The assembly of claim 1, wherein said means for transmitting rotatory motion from said second shaft to operate said telescopic legs includes a third shaft and at least one gear on said third shaft which meshes with at least one gear on said second shaft, said third shaft being axially parallel to each of said first and second shafts and being spaced therefrom.

11. A two-speed landing gear assembly for a semitrailer, comprising:

a pair of laterally spaced telescoping legs;

a horizontally arranged input shaft rotatably and slidably mounted to a first of said legs, said input shaft having a pinion gear fixed thereto, and said input shaft being axially movable between a first position for high-speed operation and a second position for low-speed operation;

a high-speed drive gear supported on said input shaft at a fixed position relative to said first leg, said drive gear having an axial opening with a plurality of axially extending spline slots on its internal surface which engage teeth on said pinion gear of said input shaft when said input shaft is axially positioned for high-speed operation, thus providing for synchronous rotation of said high-speed drive gear with said input shaft upon rotation thereof;

an output shaft rotatably mounted on said first leg, said output shaft being axially parallel to said input shaft;

a large-diameter gear fixed on said output shaft and having teeth which mesh with said pinion gear of said input shaft when said input shaft is axially positioned for low-speed operation;

a small-diameter gear fixed on said output shaft and having teeth which mesh with said high-speed gear when said input shaft is axially positioned for high-speed operation;

means for transmitting rotary motion from said output shaft to operate said telescoping legs;

a gear case supported on said first leg opposing said second leg and which together with said leg houses said high speed drive gear, said large diameter gear, said input shaft pinion, said small diameter gear and said means for transmitting rotary motion;

wherein said pinion gear is an integrally formed part of said input shaft;

wherein said means for transmitting rotary motion from said output shaft to operate said telescoping legs includes a bevel pinion mounted on said output shaft, a bevel gear mounted on an upper end of an upright elevating screw shaft which is mounted within said first leg, a bevel pinion mounted on a second leg input shaft, and a bevel gear mounted on an upper end of an upright elevating screw shaft mounted within said second leg; wherein each of said bevel pinions mesh with a corresponding one of said bevel gears attached to a corresponding one of said elevating screw shafts to simultaneously operate each of said telescoping legs when said output shaft is caused to rotate.

12. The assembly of claim 11, wherein said large diameter gear, said second gear on said output shaft, and said bevel pinion mounted on said output shaft are integrated into a one-piece combination gear, with said second gear being disposed abuttingly adjacent to said large diameter gear, and said bevel pinion being disposed abuttingly adjacent to said second gear.

13. The assembly of claim 12, wherein said input shaft and said output shaft are supported on the inboard and outboard walls of said first leg and are located between the forward and rearward walls of said first leg.

14. The assembly of claim 13, wherein a gear reduction of from about 2:1 to about 8:1 is achieved between said small radius pinion gear and said large diameter gear when said input shaft is in said second position for low-speed operation.

15. The assembly of claim 14, wherein a gear ratio of from about 1:1 to about 0.6:1 is achieved between said high-speed drive gear and said second gear on said output shaft when said input shaft is in said first position for high-speed operation.

16. A multiple-speed landing gear assembly for a trailer comprising:

at least one-vertically extendable and retractable support including a bevel gear, an input shaft, and a transmission, said input shaft being operatively connected to said support by means of said transmission whereby rotation of said input shaft causes vertical extension and retraction of said support and said input shaft having a longitudinal axis and being translatable along said axis between a first position and a second position, said transmission comprising;

a pinion coaxially mounted on said input shaft; a second shaft including a bevel pinion gear, said shaft being connected with said support such that rotation of said bevel pinion drives said bevel gear to cause vertical extension and retraction of said support, said second shaft being operatively coupled to a first drive gear which engages said coaxially mounted pinion when said input shaft is in said second axial position, said bevel gear being located between said input shaft and said second shaft;

a gear coaxially mounted on said input shaft and having internal splines which engage said pinion to lock said coaxial gear in synchronous rotation with said input shaft when said input shaft is in a first axial position, said transmission including a second drive gear which is driven by said coaxial gear.

17. A multiple-speed landing gear assembly as set forth in claim 16, wherein said input shaft is parallel and non-coaxial with said second shaft.

18. A multiple-speed landing gear assembly as set forth in claim 17, wherein said first axial position is a high-speed drive and said first drive gear has a larger gear ratio to said pinion than said second drive gear to said gear coaxially mounted on said input shaft.

19. A multiple-speed landing gear assembly as set forth in claim 16, wherein said transmission includes detente means which retain said input shaft in said first or said second axial position.

20. A multiple-speed landing gear assembly as set forth in claim 16, further comprising a third shaft having thereon said first drive gear and said second drive gear, said third shaft being axially parallel to said input shaft and said second shaft and being spaced therefrom.

21. A multiple-speed landing gear assembly for a trailer comprising:

at least one vertically extendable and retractable support, an input shaft, an output shaft operatively coupled to the support where the rotation of the output shaft extends and retracts the support, and a transmission coupling said input shaft and said output shaft, said input shaft having a longitudinal axis and being translatable along said axis between a first position and a second position, said transmission comprising;

a pinion coaxially mounted on said input shaft, a drive gear coaxially mounted on said output shaft, an intermediate shaft having a first gear engaged by said pinion when said input shaft is in the second position and a second gear which engages the drive gear on the output shaft, and said input shaft having a large diameter gear which engages the second gear of the intermediate shaft and which has internal spline slots which are engaged by said pinion when said input shaft is in the first position.

22. A multiple-speed landing gear assembly as set forth in claim 21, wherein the support has a bevel gear and the output shaft has a bevel pinion which engages the bevel gear to cause the support to extend or retract.

23. A multiple-speed landing gear assembly as set forth in claim 22, wherein said first gear on the intermediate shaft is a large diameter gear and the second gear is a small diameter gear.

24. A multiple-speed landing gear assembly as set forth in claim 22, wherein the second gear of the intermediate shaft engages both the large diameter gear of the input shaft and the drive gear of the output shaft.

25. A multiple-speed landing gear assembly as set forth in claim 24, wherein the transmission is contained within a housing.

26. A two speed landing gear assembly for a semitrailer, comprising:

first and second upright telescopic legs mounted in a laterally spaced relationship generally adjacent to a front end of said semitrailer;

a first shaft rotatably mounted on said first leg, said first shaft being axially movable between a first position for high-speed operation and a second position for low-speed operation;

a second shaft rotatably mounted on said first leg, said second shaft being axially parallel to said first shaft and spaced therefrom;

a pinion gear on said first shaft for transmitting rotary motion from said first shaft to said second shaft;

a first gear on said second shaft, said first gear having teeth which are engaged by teeth of said pinion gear when said first shaft is in the second position for low-speed operation;

a second gear on said second shaft, said second gear having a smaller diameter than said first gear;

a high-speed drive gear supported on said first shaft, said high-speed drive gear having an axial opening with a plurality of axially extending spline slots on its internal surface, the teeth of said pinion gear engaging the spline slots of said high-speed drive gear and teeth of said high-speed drive gear meshing with teeth of said second gear on said second shaft when said first shaft is in said first position for high-speed operation;

means for transmitting rotary motion from said second shaft to operate said telescopic legs which means includes a bevel pinion mounted on said second shaft, a bevel gear mounted on an upper end of an upright elevating screw shaft which is mounted within said first leg;

wherein said first gear on said second shaft, said second gear on said second shaft, and said bevel pinion mounted on said second shaft are an integrated one-piece combination gear, with said second gear being disposed abuttingly adjacent to said first gear, and said bevel pinion being disposed abuttingly adjacent to said second gear.

27. The assembly of claim 26, wherein a bevel pinion is mounted within said second leg and a bevel gear is mounted on an upper end of an upright elevating screw shaft mounted within said second leg; wherein each of said bevel pinions mesh with a corresponding one of said bevel gears attached to a corresponding one of said elevating screw shafts to simultaneously operate each of said telescoping legs when said second shaft is caused to rotate.

28. The assembly of claim 26, wherein a metal gear box encases said pinion gear of said first shaft mounted on said first leg and said high-speed drive gear; and wherein the gear box and components encased therein are generally adjacent to the inboard wall of said first leg and are disposed inboard of the outboard wall of said first leg.

29. The assembly of claim 28, further comprising a crank handle secured to the outboard end of said first shaft mounted on said first leg for manual rotation of said first shaft, wherein an intermediate portion of said first shaft mounted on said first leg is formed with a transverse continuous cylindrical opening containing a detent spring and detent balls, wherein a sleeve is mounted on an outboard face of said gear case in alignment with an opening formed in said gear case, said sleeve having outboard and inboard annular recesses formed in an internal surface thereof, said outboard and inboard recesses being spaced apart, wherein said detent balls engage said outboard and inboard annular recesses when said first shaft is in the first position and second position, respectively, for high-speed and low speed operation, respectively.

30. A three shaft landing gear assembly for a trailer, comprising;

an input shaft, an intermediate shaft, and an output shaft, said output shaft operatively coupled to a vertically extendable and retractable trailer leg for raising and lowering the trailer, said input shaft being axially movable between a first position for high-speed operation and a second position for low-speed operation, a pinion coaxially mounted on said input shaft for translating rotary motion from said first shaft to said intermediate shaft, a first gear on said intermediate shaft, said first gear having teeth which are engaged by the teeth of said pinion gear when said first shaft is in the second position for low speed operation;

a second gear on said intermediate shaft, said second gear having a smaller diameter than said first gear, a high-speed drive gear supported on said input shaft, said high-speed drive gear having an axial opening with a plurality of axially extending spline slots on its internal surface, said spline slots engaging said pinion gear when said input shaft is in said first position, said high-speed drive gear meshing with the teeth of said second gear on said intermediate shaft when said input shaft is in said first position for high-speed operation; said output shaft having a drive gear coaxially mounted thereon, said second gear of said intermediate shaft engaging said drive gear of said output shaft.

* * * * *